(12) United States Patent
Srinivasan et al.

(10) Patent No.: US 11,829,637 B2
(45) Date of Patent: Nov. 28, 2023

(54) METHODS AND SYSTEMS FOR MEMORY BANDWIDTH CONTROL

(71) Applicant: QUALCOMM Incorporated, San Diego, CA (US)

(72) Inventors: Ramkumar Srinivasan, Saratoga, CA (US); Amit Kumar, Fremont, CA (US); Vedaraman Geetha, Fremont, CA (US); Keith Robert Pflederer, Mountain View, CA (US); Vikas Kumar Sinha, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/166,561

(22) Filed: Feb. 9, 2023

(65) Prior Publication Data

US 2023/0195364 A1    Jun. 22, 2023

Related U.S. Application Data

(63) Continuation of application No. 17/666,438, filed on Feb. 7, 2022.

(60) Provisional application No. 63/251,518, filed on Oct. 1, 2021, provisional application No. 63/251,517, filed on Oct. 1, 2021, provisional application No. 63/239,702, filed on Sep. 1, 2021.

(51) Int. Cl.
*G06F 12/00* (2006.01)
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC .... G06F 3/0655; G06F 3/0604; G06F 3/0679; G06F 3/0628; G06F 12/0802; G06F 2212/282
See application file for complete search history.

(56) References Cited

U.S. PATENT DOCUMENTS

2018/0203723 A1* 7/2018 Krueger ................ G06F 3/0659
2021/0200703 A1* 7/2021 Simionescu ............ G06F 13/28
2021/0208924 A1   7/2021 Krueger
(Continued)

OTHER PUBLICATIONS

International Search Report and Written Opinion—PCT/US2022/073925—ISA/EPO—Oct. 19, 2022.

*Primary Examiner* — Shawn X Gu
(74) *Attorney, Agent, or Firm* — W&T

(57) ABSTRACT

Resources of an electronic device are partitioned into a plurality of resource portions to be utilized by a plurality of clients. Each resource portion is assigned to a respective client, has a respective partition identifier (ID), and corresponds to a plurality of memory bandwidth usage states tracked for a plurality of memory blocks. For each resource portion, each of the memory bandwidth usage states is associated with a respective memory block and indicates at least how much of a memory access bandwidth assigned to the respective partition ID to access the respective memory block is used. A usage level is determined for each resource partition based on the memory bandwidth usage states, and applied to adjust a credit count. When the credit count is adjusted beyond a request issue threshold, a next data access request is issued from a memory access request queue for the respective partition ID.

18 Claims, 14 Drawing Sheets

(56) References Cited

U.S. PATENT DOCUMENTS

2023/0067749 A1   3/2023  Srinivasan et al.
2023/0195365 A1   6/2023  Srinivasan et al.

* cited by examiner

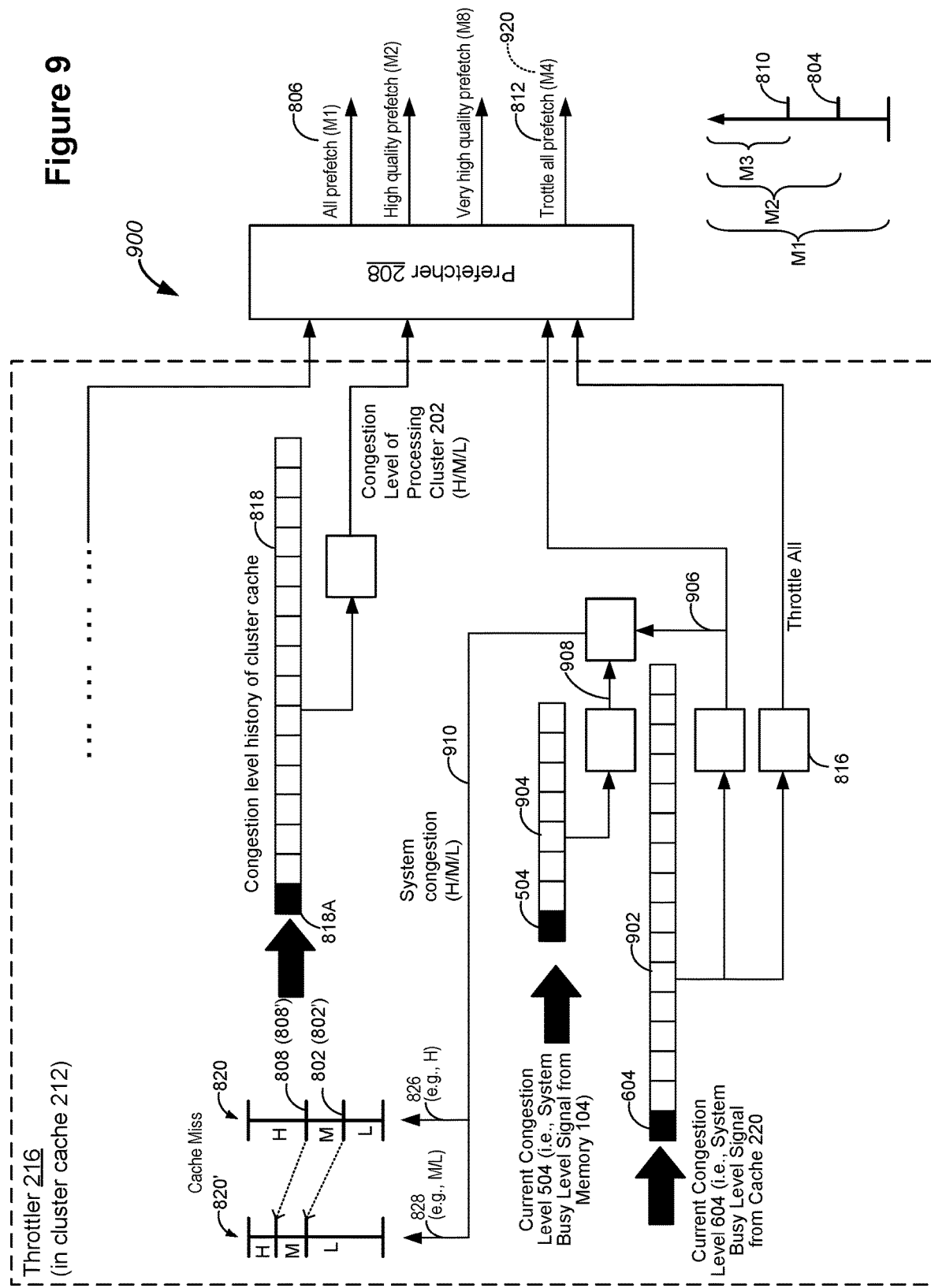

1000

At an electronic device including one or more processing clusters and a plurality of memory blocks, each processing cluster including one or more respective processors and coupled to at least one of the memory blocks: 1002

Partition resources of the electronic device into a plurality of resource portions to be utilized by a plurality of clients, each resource portion being assigned to a respective client and having a respective partition identifier (ID) 1004

Receive a plurality of data access requests associated with the plurality of clients to the plurality of memory blocks 1006

For each resource portion having the respective partition ID: 1008

Track a plurality of memory bandwidth usage states corresponding to the memory blocks 1010

Each memory bandwidth usage state is associated with a respective memory block and indicates at least how much of a memory access bandwidth assigned to the respective partition ID to access the respective memory block is used 1012

Determine a usage level associated with the respective partition ID from the plurality of memory bandwidth usage states 1014

Adjust a credit count based on the usage level 1016

Compare the adjusted credit count with a request issue threshold 1018

In accordance with a determination that the credit count is greater than the request issue threshold, issue a next data access request associated with the respective partition ID in a memory access request queue 1020

At first memory coupled to one or more processing clusters and a plurality of memory blocks in an electronic device: 1102

Forward a plurality of data access requests associated with a plurality of clients to a plurality of memory blocks 1104

> Resources of the electronic device are partitioned to a plurality of resource portions to be utilized by the plurality of clients, each resource portion being assigned to a respective client and having a respective partition identifier (ID) 1106

For each resource portion having the respective partition ID: 1108

> Identify a subset of data access requests associated with the respective partition ID for accessing the memory blocks 1110
>
> Track a plurality of memory bandwidth usage states corresponding to the memory blocks 1112
>
>> Each memory bandwidth usage state is associated with a respective memory block and indicates at least how much of a memory access bandwidth assigned to the respective partition ID to access the respective memory block is used 1114
>
> In response to each of the subset of data access requests: 1116
>
>> Determine the respective data access request is to access a corresponding memory block 1118
>>
>> Receive a memory bandwidth usage state of the corresponding memory block 1120
>>
>> Report the memory bandwidth usage state of the corresponding memory block to the one or more processing clusters 1122

At a memory block coupled to one or more processing clusters via first memory in an electronic device: 1202

Receive a set of data access requests associated with a plurality of clients to the memory block 1204

Resources are partitioned to a plurality of resource portions to be utilized by the plurality of clients, each resource portion being assigned to a respective client and having a respective partition identifier (ID) 1206

For each resource portion having the respective partition ID: 1208

Identify a subset of data access requests associated with the respective ID for accessing the memory block 1210

Track a memory bandwidth usage state associated with the respective partition ID 1212

The memory bandwidth usage state indicates at least how much of a memory access bandwidth assigned to the respective partition ID to access the memory block is used 1214

In response to each of the set of data access requests, report the memory bandwidth usage state to the one or more processing clusters 1216

In response to receiving a read request, report the memory bandwidth usage state to the one or more processing clusters, directly with a data item requested by the read request or indirectly via the first memory 1218

In response to receiving a write request, report the memory bandwidth usage state to the one or more processing clusters indirectly via the first memory 1220

Figure 12

METHODS AND SYSTEMS FOR MEMORY BANDWIDTH CONTROL

PRIORITY APPLICATIONS

The present application claims priority to and is a continuation of U.S. patent application Ser. No. 17/666,438, filed Feb. 7, 2022 and entitled "METHODS AND SYSTEMS FOR MEMORY BANDWIDTH CONTROL," which is incorporated herein by reference in its entirety.

The '438 application claims priority to U.S. Provisional Patent Application Ser. No. 63/239,702, filed Sep. 1, 2021 and entitled "Methods and Systems for Memory Bandwidth Control," U.S. Provisional Patent Application Ser. No. 63/251,517, filed Oct. 1, 2021 and entitled "Methods and Systems for Memory Bandwidth Control," and U.S. Provisional Patent Application Ser. No. 63/251,518, filed Oct. 1, 2021 and entitled "Methods and Systems for Memory Bandwidth Control," each of which is incorporated herein by reference in its entirety.

TECHNICAL FIELD

This application relates generally to microprocessor technology including, but not limited to, methods, systems, and devices for controlling memory accesses to memory external to one or more processing clusters of a microprocessor that provides computational and storage resources to multiple clients.

BACKGROUND

A large amount of traffic often exists in a microprocessor of a computer system to facilitate both cache prefetching from a slower memory or cache to a faster local cache and regular memory accesses required by operations of individual processor units of the microprocessor. In the context of a processor cluster (i.e., a multicore microprocessor), computational and storage resources of the microprocessors can be partitioned to sponsor multiple tenants or clients with different portions of these resources. It would be highly desirable to provide an electronic device or system that manages cache prefetching and regular memory accesses associated with different clients efficiently for each processor cluster of the multicore microprocessor.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of some implementations are used to manage memory request accesses to memory blocks (e.g., Double Data Rate Synchronous Dynamic Random-Access Memory (DDR SDRAM)) external to a processing cluster based on memory bandwidth usage states of different clients of an electronic device. Resources of the electronic device are partitioned into resource portions utilized by the different clients. The memory bandwidth usage states are tracked for each resource portion to monitor, in real time, how much of memory access bandwidths assigned to the respective resource portion to access the memory blocks are used. A usage level is derived from the memory bandwidth usage states of the resource portion to control whether to issue a next data access request associated with the respective resource portion in a memory access request queue. In some implementations, for each resource portion, a lower usage level and/or a longer duration of staying on the low usage level of the memory blocks lead to a higher chance of issuing the next data access request. By these means, the data access requests associated with the different clients can be managed efficiently and individually based on these clients' existing usage levels of the memory blocks.

In one aspect, a method is implemented at an electronic device for managing memory access. The electronic device includes one or more processing clusters and a plurality of memory blocks, and each processing cluster includes one or more respective processors and coupled to at least one of the memory blocks. The method includes partitioning resources of the electronic device into a plurality of resource portions to be utilized by a plurality of clients. Each resource portion is assigned to a respective client and has a respective partition identifier (ID). The method further includes receiving a plurality of data access requests associated with the plurality of clients to the plurality of memory blocks. The method further includes for each resource portion having the respective partition ID, tracking a plurality of memory bandwidth usage states corresponding to the memory blocks and determining a usage level associated with the respective partition ID from the plurality of memory bandwidth usage states. Each memory bandwidth usage state is associated with a respective memory block and indicates at least how much of a memory access bandwidth assigned to the respective partition ID to access the respective memory block is used. The method further includes for each resource portion having the respective partition ID, adjusting a credit count based on the usage level, comparing the adjusted credit count with a request issue threshold, and in accordance with a determination that the credit count is greater than the request issue threshold, issuing a next data access request associated with the respective partition ID in a memory access request queue.

In some situations, the method further includes for each resource portion having the respective partition ID, in accordance with a determination that the credit count is less than the request issue threshold, suspending from issuing any data access request from the memory access request queue of the respective partition ID until the credit count is adjusted to be greater than the request issue threshold.

In another aspect, a method is implemented at first memory for managing memory access. The first memory is coupled to one or more processing clusters and a plurality of memory blocks in an electronic device. The method includes forwarding a plurality of data access requests associated with a plurality of clients to a plurality of memory blocks. Resources of the electronic device are partitioned to a plurality of resource portions to be utilized by the plurality of clients, and each resource portion is assigned to a respective client and has a respective partition ID. The method further includes, for each resource portion having the respective partition ID, identifying a subset of data access requests associated with the respective ID for accessing the memory blocks and tracking a plurality of memory bandwidth usage states corresponding to the memory blocks. Each memory bandwidth usage state is associated with a respective memory block and indicates at least how much of a memory access bandwidth assigned to the respective partition ID to access the respective memory block is used. The method further includes, for each resource portion having the respective partition ID, in response to each of the subset of data access requests, determining the respective data access request is to access a corresponding memory block, receiving a memory bandwidth usage state of the corresponding memory block, and reporting the memory bandwidth usage state of the corresponding memory block to the one or more processing clusters.

In yet another aspect, a method is implemented at a memory system for tracking memory usage. The memory system is coupled to one or more processing clusters via first memory in an electronic device, and includes a memory block. The method includes receiving a set of data access requests associated with a plurality of clients to the memory block. Resources are partitioned to a plurality of resource portions to be utilized by the plurality of clients, and each resource portion is assigned to a respective client and has a respective partition ID. The method includes for each resource portion having the respective partition ID, identifying a subset of data access requests associated with the respective ID for accessing the memory block and tracking a memory bandwidth usage state associated with the respective partition ID. The memory bandwidth usage state indicates at least how much of a memory access bandwidth assigned to the respective partition ID to access the memory block is used. The method further includes in response to each of the set of data access requests, reporting the memory bandwidth usage state to the one or more processing clusters.

Other implementations and advantages may be apparent to those skilled in the art in light of the descriptions and drawings in this specification.

BRIEF DESCRIPTION OF THE DRAWINGS

FIG. 9 illustrates an example method of determining a system congestion level for controlling cache prefetching in an individual processing cluster, in accordance with some implementations.

FIG. 10 is a flow chart of a method of managing memory accesses to a memory 104 by an electronic device, in accordance with some implementations.

FIG. 11 is a flow chart of a method of tracking memory bandwidth usage at a first memory (e.g., cache) coupled to one or more processing clusters and a plurality of memory blocks, in accordance with some implementations.

FIG. 12 is a flow chart of a method of tracking memory bandwidth usage of a memory block of a memory system, in accordance with some implementations.

These illustrative embodiments and implementations are mentioned not to limit or define the disclosure, but to provide examples to aid understanding thereof. Additional embodiments are discussed in the Detailed Description, and further description is provided there. Other implementations and advantages may be apparent to those skilled in the art in light of the descriptions and drawings in this specification.

DESCRIPTION OF EMBODIMENTS

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details.

Figure 1:
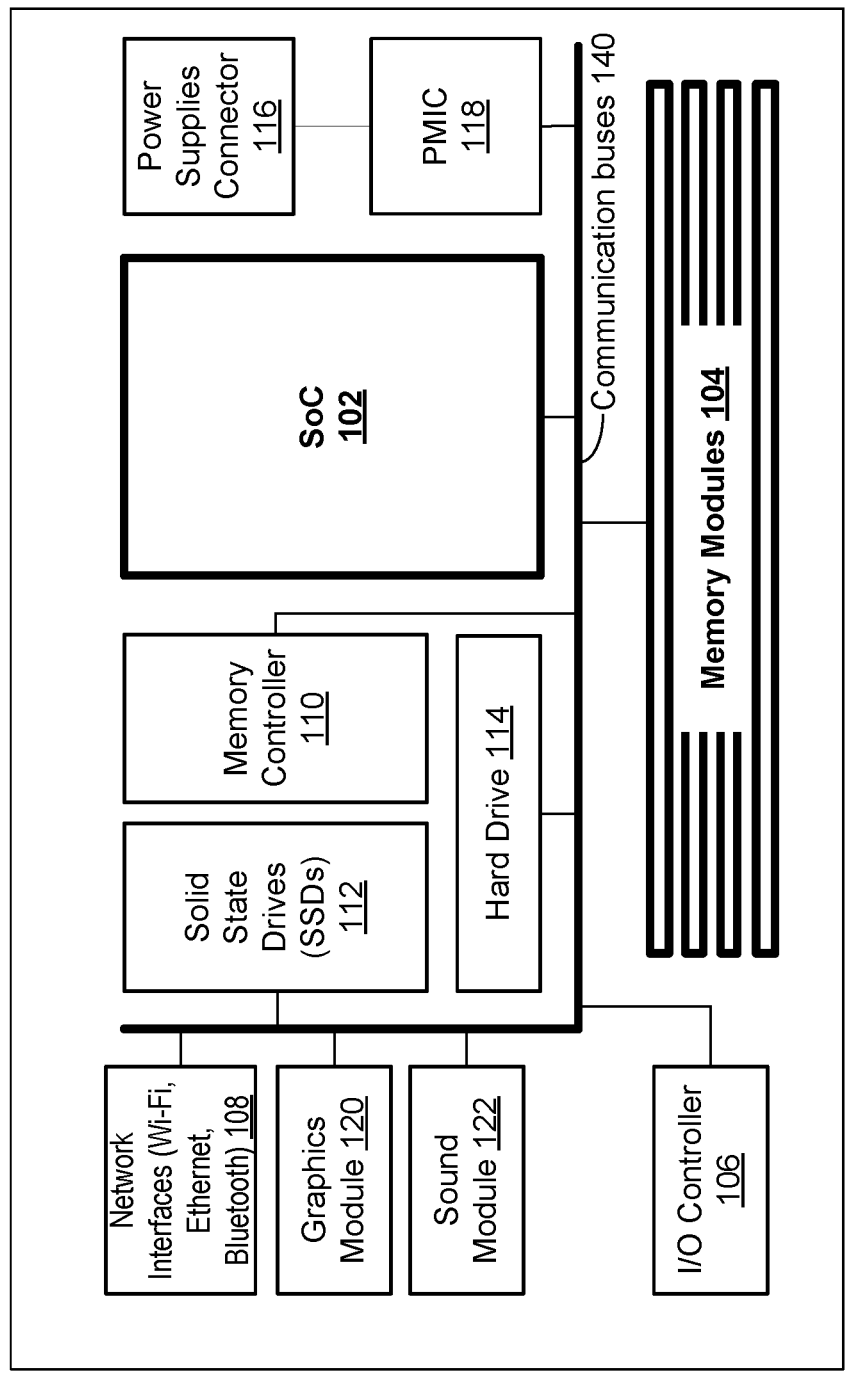
FIG. 1 is a block diagram of an example system module in a typical electronic device, in accordance with some implementations.

FIG. 1 is a block diagram of an example system module 100 in a typical electronic device in accordance with some implementations. System module 100 in this electronic device includes at least a system on a chip (SoC) 102, memory modules 104 for storing programs, instructions and data, an input/output (I/O) controller 106, one or more communication interfaces such as network interfaces 108, and one or more communication buses 140 for interconnecting these components. In some implementations, I/O controller 106 allows SoC 102 to communicate with an I/O device (e.g., a keyboard, a mouse or a track-pad) via a universal serial bus interface. In some implementations, network interfaces 108 includes one or more interfaces for Wi-Fi, Ethernet and Bluetooth networks, each allowing the electronic device to exchange data with an external source, e.g., a server or another electronic device. In some implementations, communication buses 140 include circuitry (sometimes called a chipset) that interconnects and controls communications among various system components included in system module 100.

In some implementations, memory modules 104 (e.g., memory 104 in FIGS. 2-11, memory system in FIG. 12) include high-speed random access memory, such as DRAM, SRAM, DDR RAM or other random access solid state memory devices. In some implementations, memory modules 104 include non-volatile memory, such as one or more magnetic disk storage devices, optical disk storage devices, flash memory devices, or other non-volatile solid state storage devices. In some implementations, memory modules 104, or alternatively the non-volatile memory device(s) within memory modules 104, include a non-transitory computer readable storage medium. In some implementations, memory slots are reserved on system module 100 for receiving memory modules 104. Once inserted into the memory slots, memory modules 104 are integrated into system module 100.

In some implementations, system module 100 further includes one or more components selected from:
- a memory controller 110 that controls communication between SoC 102 and memory components, including memory modules 104, in electronic device;
- solid state drives (SSDs) 112 that apply integrated circuit assemblies to store data in the electronic device, and in many implementations, are based on NAND or NOR memory configurations;
- a hard drive 114 that is a conventional data storage device used for storing and retrieving digital information based on electromechanical magnetic disks;
- a power supply connector 116 that is electrically coupled to receive an external power supply;
- power management integrated circuit (PMIC) 118 that modulates the received external power supply to other desired DC voltage levels, e.g., 5V, 3.3V or 1.8V, as required by various components or circuits (e.g., SoC 102) within electronic device;
- a graphics module 120 that generates a feed of output images to one or more display devices according to their desirable image/video formats; and
- a sound module 122 that facilitates the input and output of audio signals to and from the electronic device under control of computer programs.

It is noted that communication buses 140 also interconnect and control communications among various system components including components 110-122.

Further, one skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

In some implementations, SoC 102 is implemented on an integrated circuit that integrates one or more microprocessors or central processing units, memory, input/output ports and secondary storage on a single substrate. SoC 102 is configured to receive one or more internal supply voltages provided by PMIC 118. In some implementations, both the SoC 102 and PMIC 118 are mounted on a main logic board, e.g., on two distinct areas of the main logic board, and electrically coupled to each other via conductive wires formed in the main logic board. As explained above, this arrangement introduces parasitic effects and electrical noise that could compromise performance of the SoC, e.g., cause a voltage drop at an internal voltage supply. Alternatively, in some implementations, SoC 102 and PMIC 118 are vertically arranged in an integrated semiconductor device, such that they are electrically coupled to each other via electrical connections that are not formed in the main logic board. Such vertical arrangement of SoC 102 and PMIC 118 can reduce a length of electrical connections between SoC 102 and PMIC 118 and avoid performance degradation caused by the conductive wires of the main logic board. In some implementations, vertical arrangement of SoC 102 and PMIC 118 is facilitated in part by integration of thin film inductors in a limited space between SoC 102 and PMIC 118.

Figure 2:
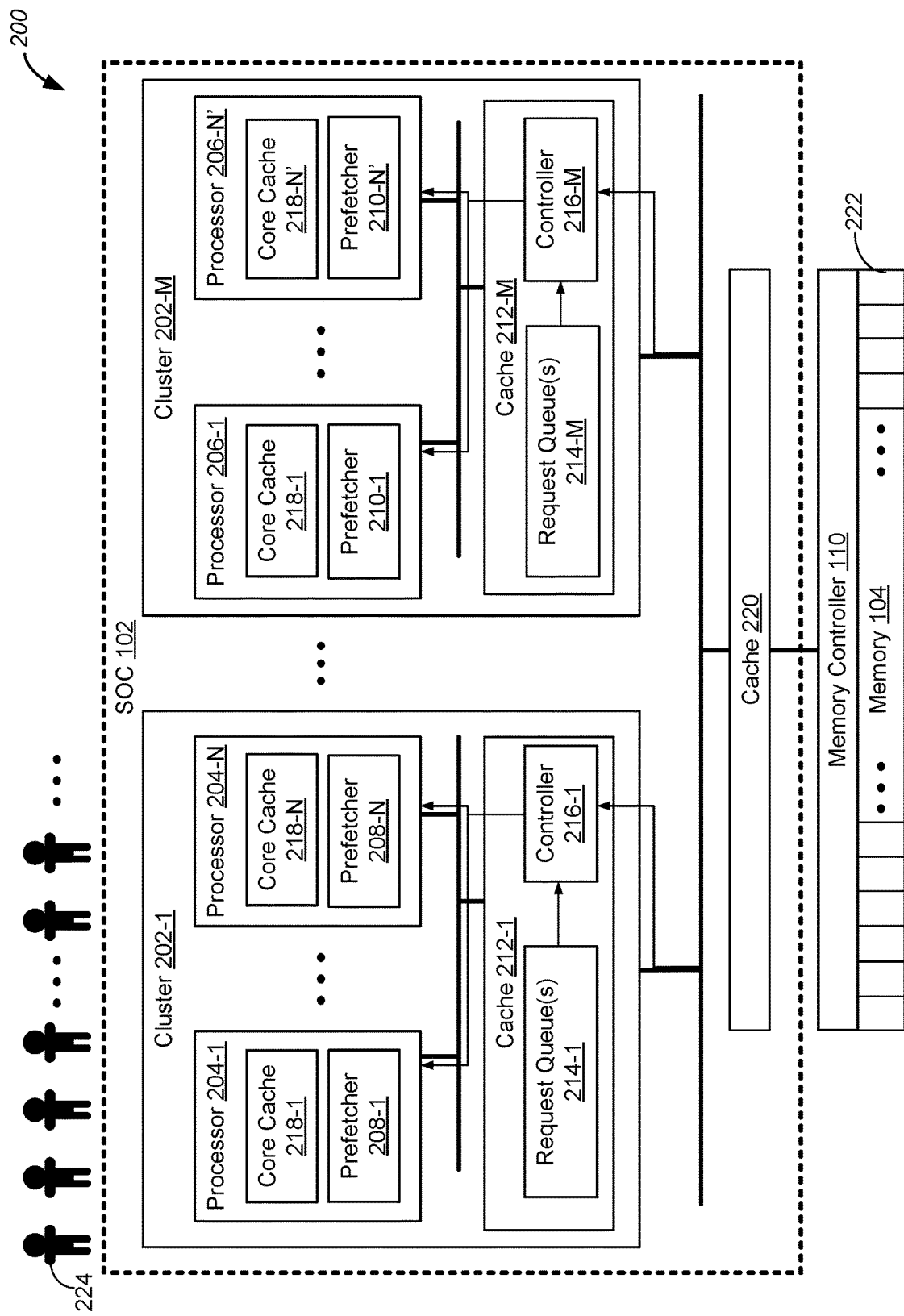
FIG. 2 is a block diagram of an example electronic device having one or more processing clusters, in accordance with some implementations.

FIG. 2 is a block diagram of an example electronic device 200 having one or more processing clusters 202 (e.g., first processing cluster 202-1, M-th processing cluster 202-M), in accordance with some implementations. Electronic device 200 further includes a cache 220 and a memory 104 in addition to processing clusters 202. Cache 220 is coupled to processing clusters 202 on SOC 102, which is further coupled to memory 104 that is external to SOC 102. Memory 104 includes a plurality of memory blocks 222, and is optionally dynamic random-access memory (DRAM). Each processing cluster 202 includes one or more processors 204, a cluster cache 212, and a controller 216. Cluster cache 212 is coupled to one or more processors 204, and maintains one or more request queues 214 for one or more processors 204. Each processor 204 further includes a respective prefetcher 208 that is coupled to controller 216 of respective processing cluster 202 to control cache prefetching associated with the respective processor 204. In some implementations, each processor 204 further includes a core cache 218 that is optionally split into an instruction cache and a data cache, and core cache 218 stores instructions and data that can be immediately executed by the respective processor 204.

In an example, first processing cluster 202-1 includes first processor 204-1, . . . , N-th processor 204-N, first cluster cache 212-1, and first controller 216-1, where N is an integer greater than 1. First cluster cache 212-1 has one or more first request queues 214-1, and each first request queue includes a queue of demand requests and prefetch requests received from a subset of processors 204 of first processing cluster 202-1. In some implementations, SOC 102 only includes a single processing cluster 202-1. Alternatively, in some implementations, SOC 102 includes at least an additional processing cluster 202, e.g., M-th processing cluster 202-M. M-th processing cluster 202-M includes first processor 206-1, . . . , N'-th processor 206-N', M-th cluster cache 212-M, and M-th controller 216-M, where N' is an integer greater than 1 and M-th cluster cache 212-M has one or more M-th request queues 214-M.

In some implementations, the one or more processing clusters 202 are configured to provide a central processing unit (CPU) for an electronic device and are associated with a hierarchy of caches. For example, the hierarchy of caches includes three levels that are distinguished based on their distinct operational speeds and sizes. For the purposes of this application, a reference to "the speed" of a memory (including a cache memory) relates to the time required to write data to or read data from the memory (e.g., a faster memory has shorter write and/or read times than a slower memory), and a reference to "the size" of a memory relates to the storage capacity of the memory (e.g., a smaller memory provides less storage space than a larger memory). The core cache 218, cluster cache 212, and cache 220 correspond to a first level (L1) cache, a second level (L2) cache, and a third level (L3) cache, respectively. Each core cache 218 holds instructions and data to be executed directly by a respective processor 204, and has the fastest operational speed and smallest size among the three levels of memory. For each processing cluster 202, the cluster cache 212 is slower operationally and bigger in size than the core cache 218, and holds data that is less likely to be accessed by processors 204 of respective processing cluster 202 than the data held in core cache 218. Cache 220 is shared by the plurality of processing clusters 202, and bigger in size and slower in speed than each core cache 218 and cluster cache 212. In each processing cluster 202, respective controller 216 monitors a system congestion level associated with memory accesses to cache 220 and memory 104 and a local cluster congestion level associated with cluster cache 212, and controls prefetches of instructions and data to core caches 218 and/or cluster cache 212 based on the system and/or cluster congestion levels. Each individual processor 204 further monitors a processor congestion level to control prefetches of instructions and data from respective cluster cache 212 into respective individual core cache 218.

In some implementations, first cluster cache 212-1 of first processing cluster 202-1 is coupled to a single processor 204-1 in the same processing cluster, and not to any other processors (e.g., 204-N). In some implementations, first cluster cache 212-1 of first processing cluster 202-1 is coupled to multiple processors 204-1 and 204-N in the same processing cluster. In some implementations, first cluster cache 212-1 of first processing cluster 202-1 is coupled to the one or more processors 204 in the same processing cluster 202-1, and not to processors in any cluster other than the first processing cluster 202-1 (e.g., processors 206 in cluster 202-M). In such cases, first cluster cache 212-1 of first processing cluster 202-1 is sometimes referred to as a second-level cache.

In each processing cluster 202, each request queue 214 optionally includes a queue of demand requests and prefetch requests received from a subset of processors 204 of respective processing cluster 202. Each data access request received from respective processor 204 is distributed to one of request queues 214. In some implementations, a request queue 214 receives only requests received from a specific processor 204. In some implementations, a request queue 214 receives requests from more than one processor 204 in processing cluster 202, allowing a request load to be balanced among the plurality of request queues 214. Specifically, in some situations, a request queue 214 receives only one type of data access requests (e.g., prefetch requests) from different processors 204 in the same processing cluster 202. Each data access request in request queue(s) 214 is issued under the control of controller 216-1 to access cache 220 and/or memory 104 to implement a memory read or write operation. In some implementations, only data access requests not satisfied by cache 220 are further sent to memory 104, and each of such data access requests may be satisfied by a respective memory block 222 of memory 104.

In each processing cluster 202, controller 216 is coupled to an output of cluster cache 212, request queues 214 in cluster cache 212, and one or more processors 204 of processing cluster 202. Specifically, controller 216 is coupled to both cache 220 and memory 104 via the output of cluster cache 212. Computational and storage resources of electronic device 200 are partitioned into a plurality of resource portions to be utilized by a plurality of clients 224. Each resource portion is assigned to a respective client 224 and has a respective partition identifier (ID). Request queues 214 include a plurality of data access requests associated with the plurality of clients 224 for requesting memory accesses to cache 220 or the plurality of memory blocks 222 in memory 104. For each resource portion (i.e., each client 224) having the respective partition ID, controller 216 tracks a plurality of memory bandwidth usage states (i.e., 402 in FIG. 4) corresponding to different memory blocks 222 of memory 104. Each memory bandwidth usage state is associated with a respective memory block 222 of memory 104, and indicates at least how much of a memory access bandwidth assigned to the respective partition ID to access respective memory block 222 of memory 104 is used. Controller 216 determines a usage level (i.e., 406 in FIG. 4) associated with each partition ID from the plurality of memory bandwidth usage states, adjusts a credit count (i.e., 408 in FIG. 4) based on the comprehensive usage level, and issues a next data access request (i.e., 412 in FIG. 4) associated with each partition ID (i.e., each client 224) in a request queue 214 based on the credit count.

In some implementations, on a cluster level, controller 216 monitors a local cluster congestion level of corresponding processing cluster 202 based on signals received from request queues 214. Specifically, controller 216 determines a congestion level of processing cluster 202 based on an extent to which the plurality of data access requests sent from one or more processors 204 in processing cluster 202 to cluster cache 212 are not satisfied by cluster cache 212. In accordance with a determination that the congestion level of processing cluster 202 satisfies first congestion criteria that require that the congestion level of processing cluster 202 is above a first cluster congestion threshold, controller 216 causes a first respective processor (e.g., processor 204-1) of one or more processors 204 to limit prefetch requests to cluster cache 212 to prefetch requests of at least a first threshold quality (i.e., to limit the prefetch requests to high quality prefetches). Specifically, in an example, controller 216 transmits a signal or other information to processors 204 (e.g., prefetcher 208-1 in processors 204-1) to enable prefetch throttling, so that only prefetch requests of at least the first threshold quality are sent to cluster cache 212. This optionally corresponds to a second prefetch throttling mode M2, which is different from a first prefetch throttle mode and limits prefetching by processors 204 from cluster cache 212 to prefetch requests of at least the first threshold quality 804 in FIG. 8.

Alternatively, in accordance with a determination that the congestion level of processing cluster 202 does not satisfy the first congestion criteria (e.g., the congestion level of processing cluster 202 is below the first cluster congestion threshold), controller 216 forgoes causing the one or more processors to limit prefetch requests to cluster cache 212 to prefetch requests of at least the first threshold quality. For example, controller 216 forgoes causing processors 204 to limit prefetch requests to cluster cache 212 entirely, such that no prefetch requests, of any quality, are limited. This optionally corresponds to the first prefetch throttling mode M1, in which prefetching of processors 204 from cluster cache 212 is not limited by controller 216 as explained with reference with FIG. 8.

In some implementations, a congestion level below the first cluster congestion threshold indicates a low degree of congestion in cluster cache 212, and a congestion level above the first cluster congestion threshold indicates one or more higher degrees of congestion. If the one or more higher degrees of congestion correspond to a single high degree of congestion, the congestion level above the first cluster congestion threshold indicates this high degree of congestion. In contrast, if the one or more higher degrees of congestion correspond to a set of degrees of congestion (e.g., medium, high, and very high), the congestion level above the first cluster congestion threshold is associated with any degree in the set of degrees of congestion.

Further, in some implementations, on a system level, controller 216 monitors a system congestion level of a memory system coupled to processing cluster 202 based on a system busy level signal (i.e., current congestion level 504 or 604) received from the output of cluster cache 212. The system busy level signal includes information of outstanding in-flight requests that are received and not satisfied by cache 220 or memory 104. Specifically, controller 216 obtains a current congestion level 604 of cache 220 (e.g., HN[2] in FIG. 6B) based on a number of outstanding in-flight requests received by cache 220, and maintains a first congestion level history (e.g., a history 902 in FIG. 9) that includes the obtained current congestion level 604 of cache 220. Controller 216 also obtains a current congestion level 504 of memory 104 (e.g., SN[2] in FIG. 5B) based on a number of outstanding in-flight requests received by memory 104, and maintains a second congestion level history (e.g., a history 904 in FIG. 9) that includes current congestion level 504 of memory 104. In some situations, data access requests not satisfied by cache 220 are further sent to memory 104, and the number of outstanding in-flight requests received by memory 104 (i.e., current congestion level 504) is therefore determined based on an extent to which data access requests sent to cache 220 are not satisfied by cache 220.

Controller 216 causes processing cluster 202 to limit prefetch requests from processing cluster 202 based on at least one of current congestion level 604 of cache 220 and current congestion level 504 of memory 104. In some implementations, the prefetch requests from processing cluster 202 are limited based on the first congestion level history and/or the second congestion level history. In some implementations, controller 216 is configured to determine the first congestion level of cache 220 (which is a composite congestion level) based on the first congestion level history or determine a second congestion level of memory 104 (which is a composite congestion level) based on the second congestion level history. The prefetch requests from processing cluster 202 may be disabled, from joining request queue(s) 214 of processing cluster 202, based on the first congestion level and/or the second congestion level. In some implementations, a history of the first congestion level and/or a history of the second congestion level are maintained by controller 216 itself. Additionally, the cluster congestion threshold(s) applied to control prefetch qualities are set forth based on the first and/or second congestion level histories of cache 220 and memory 104. More details on application of system congestion levels of cache 220 and memory 104 are explained below with reference to FIGS. 8 and 9.

Figure 3A:
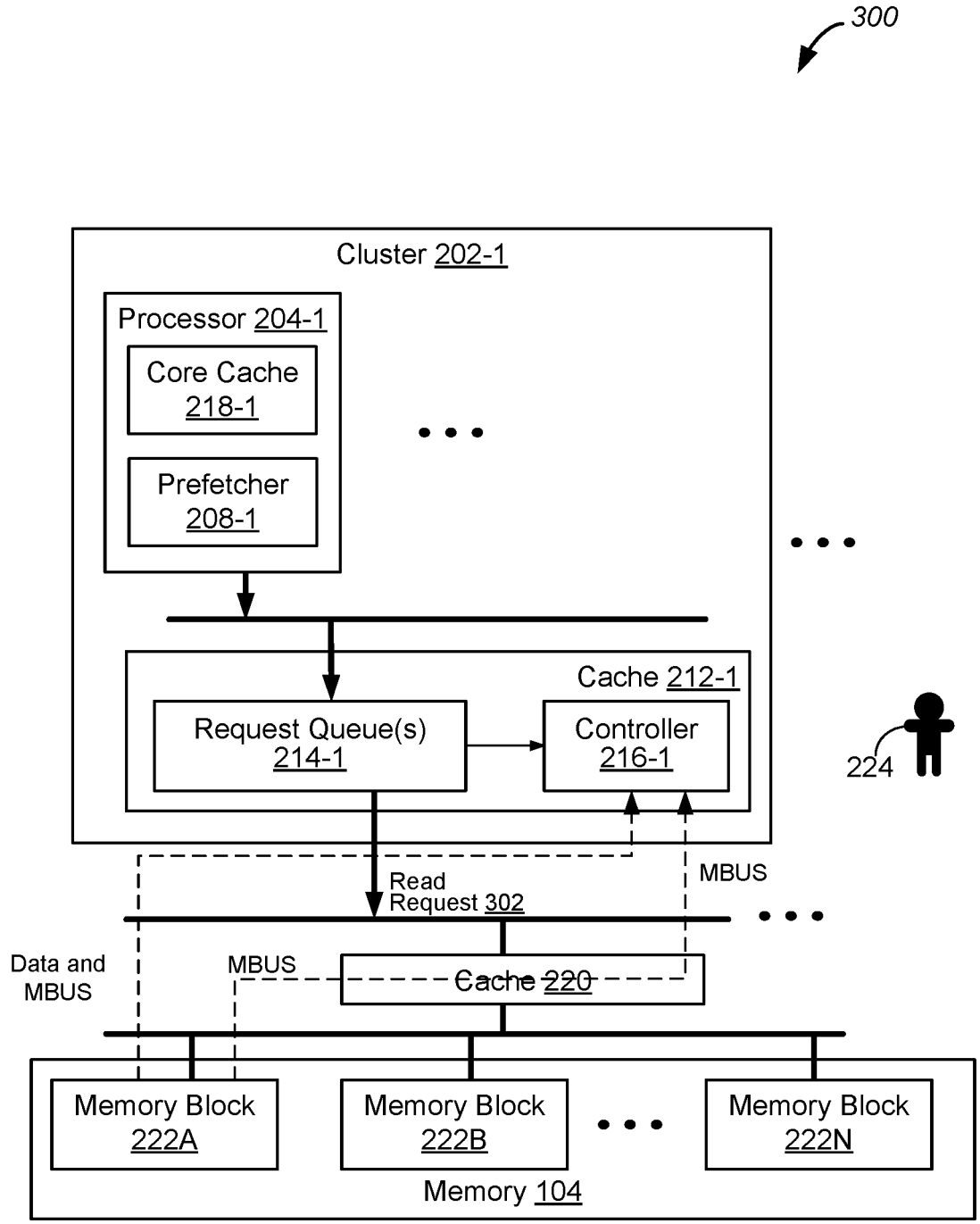
FIGS. 3A and 3B are block diagrams of example electronic devices that control and track requests for accessing data stored in memory blocks external to a processing cluster, in accordance with some implementations.
Figure 3B:
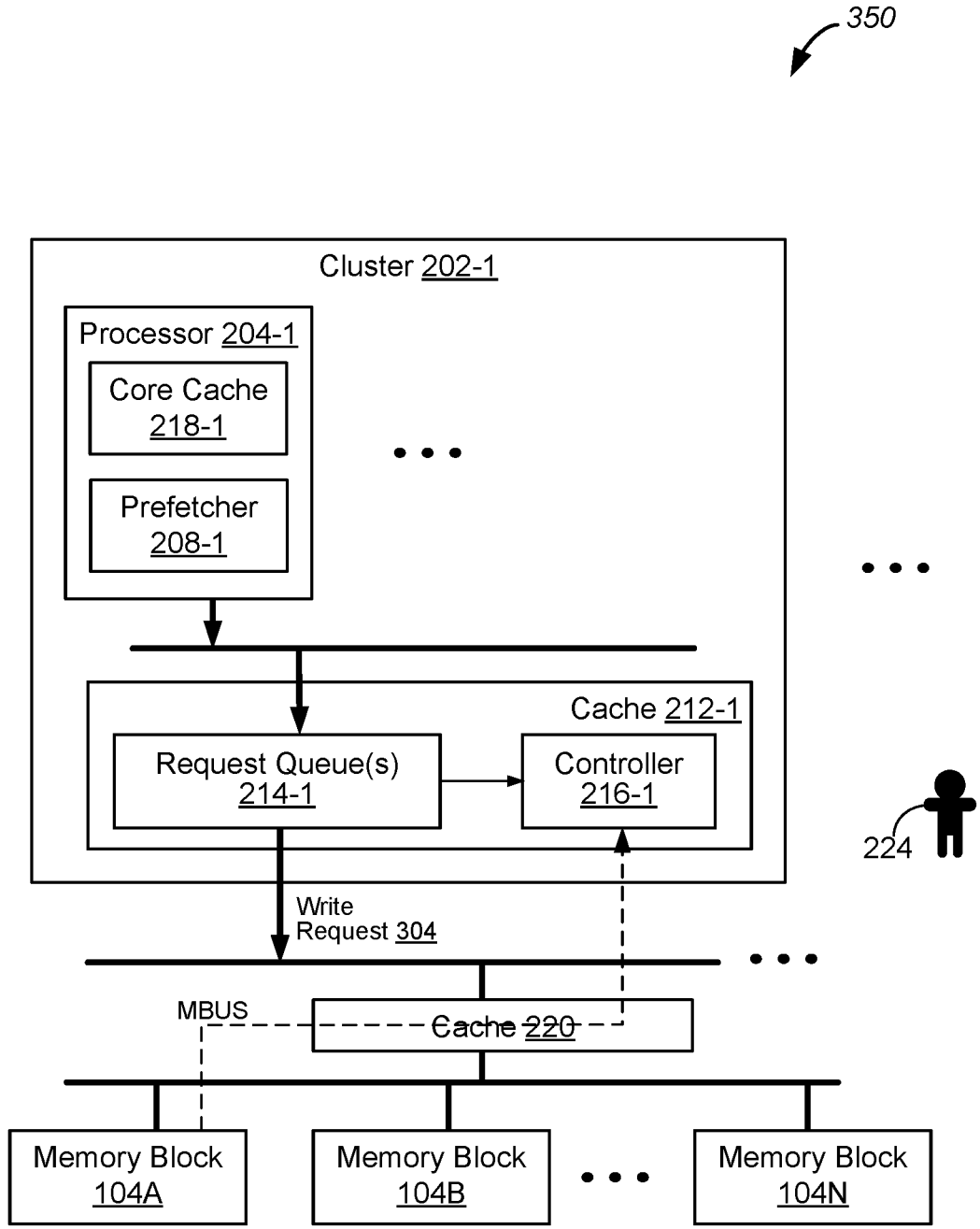

FIGS. 3A and 3B are block diagrams of example electronic devices 300 and 350 that control and track requests for accessing data stored in memory blocks 222 external to a processing cluster 202, in accordance with some implementations. In each of the electronic devices 300 and 350, one or more processing clusters 202 are coupled to a cache 220 that is further coupled to a memory 104 including a plurality of memory blocks 222. Each processing cluster 202 includes one or more processors 204 and a cluster cache 212 coupled to the one or more processors 204. Each processor 204 further includes a core cache 218 and a prefetcher 208, and the cluster cache 212 further includes one or more request queues 214 and a controller 216. Core cache 218, cluster cache 212, and cache 220 form a hierarchy of caches to provide instructions and data to processor(s) 204. Core cache 218 is configured to store instructions and data to be executed directly by each processor 204, and cluster cache 212 is configured to provide instructions and data that are less likely to be executed by processor 204 and will be loaded into core cache 218 if needed. Cache 220 is configured to provide instructions and data that are less likely to be executed by processor 204 than those in cluster cache 212 and will be loaded into cluster cache 212 if needed. Cluster cache 212 of processing cluster 202 includes one or more data access request queues 214 that further include a plurality of data access requests sent from the one or more processors 204 to cache 220 within a predefined period of time, i.e., include all demand requests and all prefetch requests. In some implementations, if a data access request is not satisfied by cache 220, it is further sent to one of the plurality of memory blocks 222 (e.g., first memory block 222A) of memory 104.

Referring to FIG. 3A, in some implementations, the plurality of data access requests in the one or more data access request queues 214 includes a read request 302 that is configured to request extraction of a data item from a first memory block 222A in memory 104. The read request 302 is associated with one of a plurality of clients 224 (e.g., a first client 224A) and made by processing cluster 202 on behalf of the one of the plurality of clients 224. Controller 216 controls processing cluster 202 to issue read request 302 to cache 220. Cache 220 forwards to read request 302 to first memory block 222A. Upon receiving read request 302, first memory block 222A extracts the data item requested by the read request, determines that the read request is associated with the one of the plurality of clients 224, and obtains a memory bandwidth usage state MBUS that has been tracked locally for the one of the plurality of clients 224. The memory bandwidth usage state MBUS indicates at least how much of a memory access bandwidth assigned to the one of the plurality of clients 224 to access first memory block 222A is used. In response to read request 302, first memory block 222A sends the requested data item directly to processing cluster 202. In some implementations, the memory bandwidth usage state MBUS of the one of the plurality of clients 224 is sent with the requested data item directly to processing cluster 202. Alternatively, in some implementations, the memory bandwidth usage state MBUS of the one of the plurality of clients 224 is sent to cache 220, and cache 220 forwards the memory bandwidth usage state MBUS to processing cluster 202. Additionally, in some implementations, in response to single read request 302, the memory bandwidth usage state MBUS of the one of the plurality of clients 224 is reported by first memory block 222A twice, i.e., directly from first memory block 222A to processing cluster 202 and indirectly via cache 220.

In some implementations, the plurality of data access requests in the one or more data access request queues 214 of each processing cluster 202 includes a plurality of read requests 302, and each read request 302 is configured to request extraction of a respective data item from a respective memory block 222 in memory 104. Each read request 302 is associated with a respective client 224 and made by processing cluster 202 on behalf of the respective client. In response to each read request 302, memory block 222 corresponding to the respective read request 302 reports a memory bandwidth usage state MBUS of the respective client 224 to processing cluster 202 directly or indirectly via cache 220, thereby allowing processing cluster 202 to track a plurality of memory bandwidth usage state MBUSs for the plurality of clients 224. Each client 224 corresponds a subset of memory bandwidth usage state MBUSs each associated with a respective one of memory blocks 222 of memory 104. By these means, for each client 224, the memory bandwidth usage state MBUSs associated with memory blocks 222 of memory 104 are updated in response to read requests 302 issued by processing cluster 202 for respective client 224.

Referring to FIG. 3B, in some implementations, the plurality of data access requests in the one or more data access request queues 214 includes a write request 304 that is configured to request storage of a data item into a first memory block 222A in memory 104. The write request 304 is associated with one of the plurality of clients 224 and made by processing cluster 202 on behalf of the one of the plurality of clients 224. Therefore, the write request 304 is implemented using storage resources assigned to the one of the plurality of clients 224. Controller 216 controls processing cluster 202 to issue write request 304 to cache 220. Cache 220 forwards to write request 304 to first memory block 222A. Upon receiving write request 304, first memory block 222A optionally writes or does not write the data item contained in write request 304 into a memory unit depending on whether it has any remaining memory access bandwidth assigned to the one of the plurality of clients 224. Additionally, first memory block 222A determines that write request 304 is associated with the one of the plurality of clients 224, and obtains the memory bandwidth usage state MBUS that has been tracked for the one of the plurality of clients 224. In response to write request 304, first memory block 222A sends a write confirmation message indicating whether the data item has been written into first memory block 222A to cache 220. The write confirmation message further includes the memory bandwidth usage state MBUS of the one of the plurality of clients 224. Cache 220 forwards to processing cluster 202 the write confirmation message including the memory bandwidth usage state MBUS of first memory block 222A by the one of the plurality of clients 224.

In some implementations, the plurality of data access requests in the one or more data access request queues 214 include a plurality of read requests 304, and each write request 304 is configured to request storage of a respective data item into a respective memory block 222 in memory 104. Each write request 304 is associated with a respective client 224 and made by processing cluster 202 on behalf of respective client 224. In response to each write request 304, memory block 222 corresponding to respective write request 304 reports a memory bandwidth usage state MBUS of respective client 224 to processing cluster 202 indirectly via cache 220. By these means, for each client 224, the memory bandwidth usage states associated with memory blocks 222 of memory 104 are updated in response to write requests 304 issued by processing cluster 202 for respective client 224.

Figure 4:
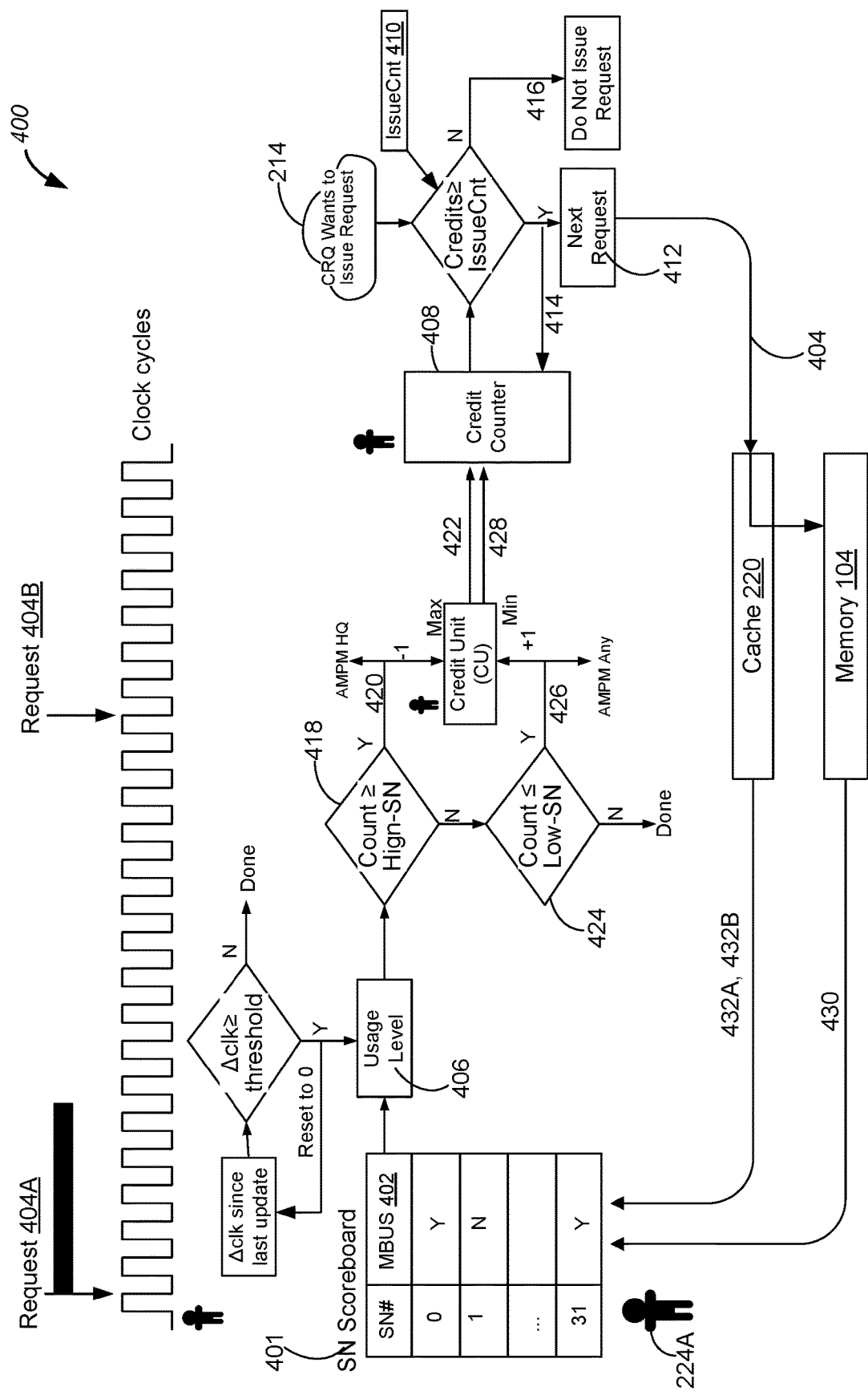
FIG. 4 illustrates an example process implemented by a controller of a processing cluster to control requests of a resource partition to access data stored in memory blocks based on memory bandwidth usage states, in accordance with some implementations.

FIG. 4 illustrates an example process 400 implemented by a controller 216 of a processing cluster 202 to control requests of a resource partition to access data stored in memory blocks 222 based on memory bandwidth usage states 402, in accordance with some implementations. As explained above, an electronic device includes one or more processing clusters 202, cache 220, and memory 104. Such computational and storage resources are shared among a plurality of clients 224, and therefore, are partitioned into a plurality of resource portions to be utilized by the plurality of clients 224. Each resource portion is assigned to a respective client 224, and has a respective partition identifier (ID) that represents the respective resource portion and respective client 224. Process 400 is implemented by controller 216 of processing cluster 202 for a first client 224A which is assigned with the resource partition associated with the respective partition ID. Each client 224 is optionally a private person or a business entity that subscribes to computer service provided by the electronic device. Controller 216 of processing cluster 202 stores a memory block usage table 401 for each of the plurality of clients including first client 224A.

Specifically, the memory block usage table 401 includes a plurality of rows. Each row corresponds to a respective one of memory blocks 222 of memory 104 and is configured to store and track a plurality of memory bandwidth usage states 402 corresponding to memory blocks 222. Each memory bandwidth usage state 402 is associated with a respective memory block 222 and indicates at least how much (e.g., 75%) of a memory access bandwidth assigned to the respective partition ID of first client 224A to access respective memory block 222 is used. For example, referring to FIG. 4, the memory block usage table 401 includes 32 rows corresponding to 32 memory blocks 222 of memory 104. For each row, a first column includes an integer number representing a memory block identification of each memory block 222, and a second column includes a flag representing a respective memory bandwidth usage state 402, e.g., whether more than 75% of the memory access bandwidth assigned to first client 224A to access respective memory block 222 is used. At least memory blocks 0 and 31 have used more than 75% of the memory access bandwidth assigned to first client 224A, and at least memory block 1 has not used more than 75% of the memory access bandwidth assigned to first client 224A.

A plurality of data access requests are waiting within one or more request queues 214 of processing cluster 202. Controller 216 operates according to a clock frequency, and is configured to manages issuing of the plurality of data access requests based on memory bandwidth usage states 402 of memory blocks 222. In some situations, the plurality of data access requests are generated by more than one resource partition of more than one client 224, and includes a subset of data access requests for the resource partition of first client 224A. The subset of data access requests further includes a first request 404A and a second request 404B following first request 404A. Each request 404 is optionally a read request (e.g., read request 302) to read a data item from a respective memory block 222 or a write request (e.g., write request 304) to store a data item into respective memory block 222. Controller 216 issues the subset of data access requests associated with the resource partition of first client 224A to access different memory blocks 222 based on memory bandwidth usage states 402 that are stored in the memory block usage table 401 in association with different memory blocks 222.

In some implementations, controller 216 generates a usage level 406 associated with the partition ID of first client 224A from the plurality of memory bandwidth usage states 402 stored in the memory block usage table 401. For example, usage level 406 is equal to a number of memory blocks 222 that have used more than 75% of the memory access bandwidth assigned to the partition ID of first client 224A, i.e., a number of "Y" in the second column of the memory block usage table 401. More specifically, in an example, usage level 406 is equal to 11, and 11 out of 32 memory blocks 222 have used more than 75% of the memory access bandwidth assigned to the partition ID of first client 224A.

Controller 216 adjusts (e.g., accumulates) a credit count 408 based on usage level 406, and compares credit count 408 with a request issue threshold 410 to determine whether a next data access request 412 associated with the partition ID of first client 224A needs to be issued. If credit count 408 has been accumulated beyond request issue threshold 410, next data access request 412 associated with the partition ID of the first client 224A is issued. Credit count 408 is optionally reset (414) to zero or reduced by a predefined value (e.g., by 1, by request issue threshold 410). Conversely, if credit count 408 is less than request issue threshold 410, controller 216 suspends (416) the one or more request queues 214 from issuing any data access request of the respective partition ID until credit count 408 is adjusted to be greater than request issue threshold 410.

In some implementations, controller 216 adjusts credit count 408 based on usage level 406 at least partially according to a clock frequency. After first request 404A is issued to access a respective memory block 222 for the partition ID associated with first client 224A, one or more of the plurality of memory bandwidth usage states 402 stored in the memory block usage table 401 associated with first client 224A are updated. After a predefined number of clock cycles following this update of memory bandwidth usage states 402, usage level 406 is determined from the plurality of memory bandwidth usage states 402 stored in the memory block usage table 401. Further, after the predefined number of clock cycles following the update of memory bandwidth usage states 402 and until next data access request 412 (e.g., second request 404B) is issued, credit count 408 is adjusted and compared with the request issue threshold periodically, e.g., once during each subsequent clock cycle or once every 5 clock cycles.

In some implementations, after determining usage level 406 associated with the respective partition ID of first client 224A from memory bandwidth usage states 402, controller 216 compares usage level 406 with one or more usage thresholds associated with the partition ID (e.g., a high usage threshold High-SN and a low usage threshold Low-SN). In some implementations, the usage threshold High-SN or Low-SN varies for different clients 224. Alternatively, in some implementations, the usage threshold High-SN or Low-SN is the same for different clients 224. In accordance with a determination that usage level 406 is equal to or greater than (418) the high usage threshold High-SN of first client 224A, controller 216 reduces (420) credit count 408 by a respective credit unit CU corresponding to the respective partition ID of first client 224A. In some implementations, credit count 408 is reduced (422) by the respective credit unit CU periodically at every one or more clock cycles, until next data access request 412 (e.g., second request 404B) is issued. Conversely, in accordance with a determination that usage level 406 is equal to or less than (424) the low usage threshold Low-SN of the first client, controller 216 increases (426) credit count 408 by the respective credit unit corresponding to the partition ID. In some implementations, credit count 408 is increased (428) by the respective credit unit periodically at every one or more clock cycles, until next data access request 412 (e.g., second request 404B) is issued. Additionally, in accordance with a determination that usage level 406 is between the high usage threshold High-SN and the low usage threshold Low-SN, controller 216 maintains credit count 408.

For each partition ID of respective client 224 (e.g., first client 224A), credit count 408 indicates a priority level for issuing data access requests of first client 224A. In some implementations, the first client's usage level 406 is high (i.e., substantially close to its memory access bandwidths to access memory blocks 222), and a substantially high credit count 408 can still result in a relatively high priority level of issuing next data access request 412 associated with first client 224A. Despite the first client's high usage level 406, the next data access 412 are still issued for the partition ID of first client 224A because of the substantially high credit count 408. Conversely, in some implementations, the first client's usage level 406 is low (i.e., substantially far away from its memory access bandwidths to access memory blocks 222), and a substantially low credit count 408 can still result in a relatively low priority level of issuing next data access request 412 associated with first client 224A. Despite the first client's low usage level 406, the next data access request 412 still cannot be issued for the partition ID of first client 224A because of the substantially low credit unit 408. However, under some circumstances, despite the first client's low usage level 406, the substantially low credit unit 408 gradually increases over time, so does the relatively low priority level for issuing data access requests of first client 224A until next data access request 412 is issued for the partition ID of first client 224A. In the worst situations, the first client's usage level 406 is high (i.e., substantially close to its memory access bandwidths to access memory blocks 222), and a substantially low credit unit 408 results in a relatively low priority level of issuing next data access request 412 associated with first client 224A. Controller 216 waits for the substantially low credit count 408 to gradually increase over time until next data access request 412 is issued for the partition ID of first client 224A. As such, a lower usage level 406 and/or a longer duration of staying on the low usage level of the memory blocks lead to a higher chance of issuing next data access request 412.

After controller 216 issues each request 404, respective request 404 is received by cache 220 and forwarded to a corresponding memory block 222 of memory 104. In some implementations, in response to a read request 404 issued from the respective partition ID of first client 224A to a respective memory block 222, respective memory block 222 directly updates (430) to processing cluster 202 the respective memory bandwidth usage state 402 of respective memory block 222, concurrently with providing a data item requested by the read request. Alternatively, in some implementations, in response to a read request 404 issued from the respective partition ID of first client 224A, respective memory block 222 indirectly updates (432A) the respective memory bandwidth usage state 402 of respective memory block 222 via cache 220. Additionally, in some implementations, the respective memory bandwidth usage state 402 of respective memory block 222 are updated in the memory block usage table 401 twice, directly from memory 104 (430) and indirectly by way of cache 220 (432A). More details on updating memory bandwidth usage states 402 associated with first client 224A in response to the read request are discussed above with reference to FIG. 3A.

Further, in some implementations, in response to each write request 404 issued from the respective partition ID of first client 224A to respective memory block 222, respective memory block 222 updates (432B) the respective memory bandwidth usage state 402 associated with respective memory block 222 by way of cache 220. There is no direct update of the respective memory bandwidth usage state 402 for the write request 404. In some implementations, the plurality of memory blocks 222 are configured to receive data access requests sent from the one or more processing clusters 202 to cache 220 that are not satisfied by cache 220. More details on updating memory bandwidth usage states 402 associated with first client 224A in response to the write request are discussed above with reference to FIG. 3B.

In some implementations, each of memory bandwidth usage states 402 associated with memory blocks 222 is provided by respective memory block 222 as a multibit state number. Usage level 406 is determined by determining how many of the respective multibit state number of memory bandwidth usage states 402 are equal to a predefined value. For example, each memory bandwidth usage state 402 of a respective memory block 222 has two bits, and usage level 406 is determined based on how many of memory bandwidth usage states 402 of memory blocks 222 are equal to "11". In some implementations, each of memory bandwidth usage states 402 associated with memory blocks 222 is a flag having one of two predefined values (e.g., "Y", "N").

Figure 5A:
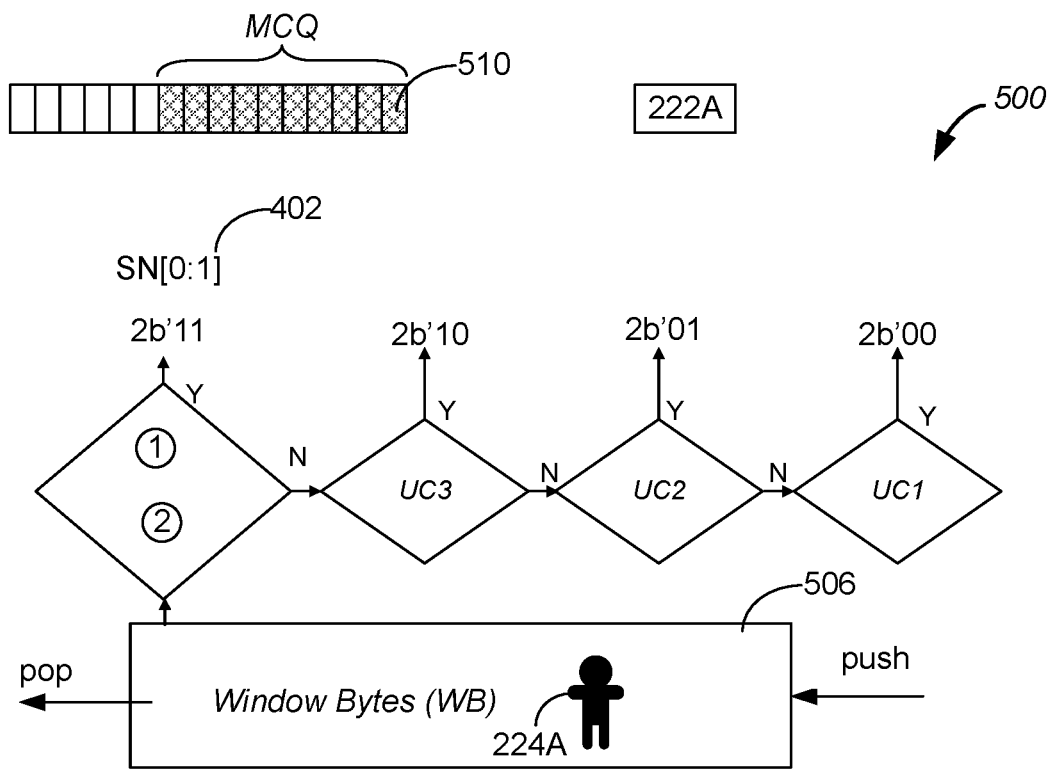
FIGS. 5A and 5B illustrate example processes implemented by a memory to track a memory bandwidth usage state of an individual memory block and a current congestion level of the memory, in accordance with some implementations.
Figure 5B:
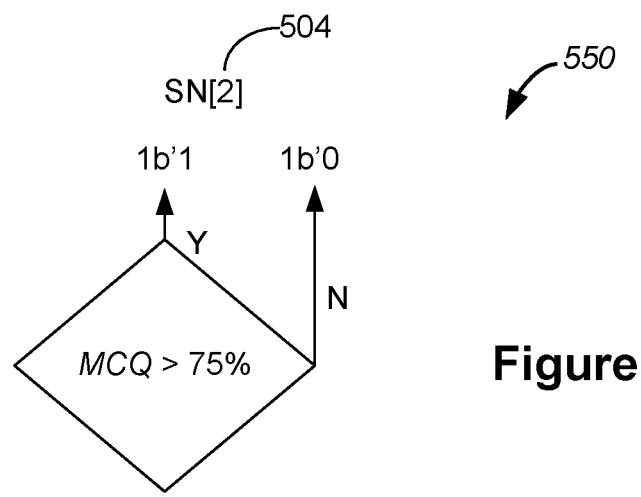

FIGS. 5A and 5B illustrate example processes 500 and 550 implemented by a memory 104 to track a memory bandwidth usage state 402 of an individual memory block 222 and a current congestion level 504 of a memory 104, in accordance with some implementations. The memory 104 includes a plurality of memory blocks 222. A memory controller 110 is coupled to memory blocks 222 to manage data access requests received by memory 104 and track memory bandwidth usage state 402 and current congestion level 504 of memory 104. Memory bandwidth usage state 402 (i.e., SN[0:1) is associated with a respective partition ID of a first client 224A, and indicates at least how much of a memory access bandwidth assigned to the respective partition ID to access first memory block 222A is used, i.e., an average data access level of the partition ID of first client 224A to first memory block 222A. Current congestion level 504 (i.e., SN[2]) indicates whether a second total number of data access requests MCQ that are waiting in a second request queue 510 of memory 104 exceeds a second predefined portion (e.g., 75%) of an external memory capacity.

Memory controller 110 determines that a set of data access requests issued by processing cluster 202 are associated with first memory block 222A, and first memory block 222A receives the set of data access requests. The set of data access requests are associated with a plurality of clients 224, wherein resources including a storage capability of this first memory block 222A are partitioned to a plurality of resource portions to be utilized by the plurality of clients 224. Each resource portion is assigned to a respective client 224 and has a respective partition ID of the respective client 224. For first client 224A, a subset of data access requests is identified for accessing first memory block 222A as being associated with the respective ID of first client 224A. One of the first memory block's memory bandwidth usage state 402 is tracked for the respective partition ID of first client 224A. In response to each of the set of data access requests, memory controller 110 reports memory bandwidth usage state 402 associated with the respective partition ID of first client 224A to the one or more processing clusters 202 on behalf of first memory block 222A.

Memory controller 110 keeps a memory block usage window 506 for each partition ID including that of first client 224A, and the memory block usage window 506 corresponds to a plurality of most recent consecutive clock cycles. In the memory block usage window 506, a third number of bytes in first memory block 222A has been accessed by the respective partition ID of first client 224A during the second number of clock cycles. Upon receiving each data access request associated with the respective partition ID of first client 224A, memory controller 110 determines a total number of bytes (i.e., Window Bytes) processed for the first client 224A in first memory block 222A in the memory block usage window 506. Window 506 includes a history number of clock cycles, e.g., equal to 16×128 clock cycles. This total number of bytes (i.e., Window Bytes) represents an average data access level of the partition ID of first client 224A to the memory block 222 within window 506, and is compared with a memory access bandwidth assigned to the respective partition ID to access the memory block 222 to determine how much of the memory access bandwidth assigned to the respective partition ID to access the memory block 222 is used, i.e., memory bandwidth usage state 402 indicating an average data access level of first client 224A to first memory block 222A.

In some implementations, memory bandwidth usage state 402 associated with the respective partition ID of first client 224A is represented by a second multibit state number SN, e.g., 2 bits of a 3b state number SN[0:2] or a 2b state number SN[0:1]. If a portion of the memory access bandwidth assigned to the respective partition ID of first client 224A to access first memory block 222A is used and satisfies a first usage condition UC1, the 2b state number SN[0:1] is equal to "00". If the used portion of the memory access bandwidth assigned to the respective partition ID of first client 224A to access first memory block 222A satisfies a second usage condition UC2, the 2b state number SN[0:1] is equal to "01". If the used portion of the memory access bandwidth assigned to the respective partition ID of first client 224A to access first memory block 222A satisfies a third usage condition UC3, the 2b state number SN[0:1] is equal to "10". If the used portion of the memory access bandwidth assigned to the respective partition ID of first client 224A to access the memory block 222 satisfies a fourth usage condition UC4 (e.g., the used portion being greater than 75% of the assigned memory access bandwidth), the 2b state number SN[0:1] is equal to "11". As such, a magnitude of the second multibit state number SN[0:1] increases with how much of the memory access bandwidth assigned to the respective partition ID to access the memory block is used, so are memory bandwidth usage state 402 and the average data access level of first client 224A to first memory block 222A. In some embodiments, the usage conditions UC1, UC2, UC3, and UC4 are exclusive to each other.

Alternatively, in some implementations, the memory bandwidth usage state (e.g., the 2b state number SN[0:1]) associated with the respective partition ID of first client 224A is also tracked based on an alternative current congestion level of the memory block 222 and/or whether the predefined memory access bandwidth is enforced (i.e., whether HardLimit=1). Memory controller 110 monitors a second total number of data access requests MCQ that are waiting in a second request queue 510 of memory 104, and the alternative current congestion level indicating whether the second total number of data access MCQ requests exceeds an alternative predefined portion of an external memory capacity.

In some implementations, the 2b state number SN[0:1] of first memory block 222A is equal to "11" is under two conditions. Specifically, in the first condition, an allocation of first memory block 222A to first client 224A is substantially used, and memory 104 is overall too busy. The 2b state number SN[0:1] is equal to "11" (a) when more than 75% of the memory access bandwidth assigned to the respective partition ID of the first client 224A to access the memory block 222 is used and (b) when the alternative current congestion level indicates that the second total number of data access requests MCQ exceeds the alternative predefined portion (e.g., x %, where x is optionally equal to 85) of the external memory capacity. In the second condition, an allocation of first memory block 222A to first client 224A is substantially used, and the allocation is strictly enforced. The 2b state number SN[0:1] is equal to "11" (a) when more than 75% of the memory access bandwidth assigned to the respective partition ID of the first client 224A to access the memory block 222 is used, i.e., the average data access level to the memory block has exceeded the predefined threshold portion (100%); and (b) when the predefined memory access bandwidth is enforced (i.e., HardLimit=1). Stated another way, memory bandwidth usage state 402 is set to a predefined value associated with a high usage state in accordance with (a) a determination that the first client's average data access level to first memory block 222A has exceeded a predefined threshold portion of the predefined memory access bandwidth and (b) a determination that the predefined memory access bandwidth is enforced or that an alternative current congestion level of memory 104 is high.

In some implementations, memory controller 110 monitors a second total number of data access requests MCQ that are waiting in a second request queue 510 of memory 104, and the second request queue 510 optionally includes requests to other partition IDs associated with other clients 224. Current congestion level 504 of memory 104 indicates whether the second total number of data access requests MCQ exceeds a second predefined portion (e.g., 75%) of an external memory capacity of memory 104 including memory blocks 222. In some implementations, current congestion level 504 of memory 104 is represented by a bit SN[2] of the second multibit state number. In some implementations, the second current congestion level 504 of memory 104 is used to control throttling of prefetch requests. In some implementations, the second current congestion level 504 of memory 104 including the plurality of memory blocks 222 is used to control qualities of prefetch requests of the one or more processing clusters. More details on applications of current congestion level 504 of memory 104 are discussed below with reference to FIGS. 8 and 9.

Figure 6A:
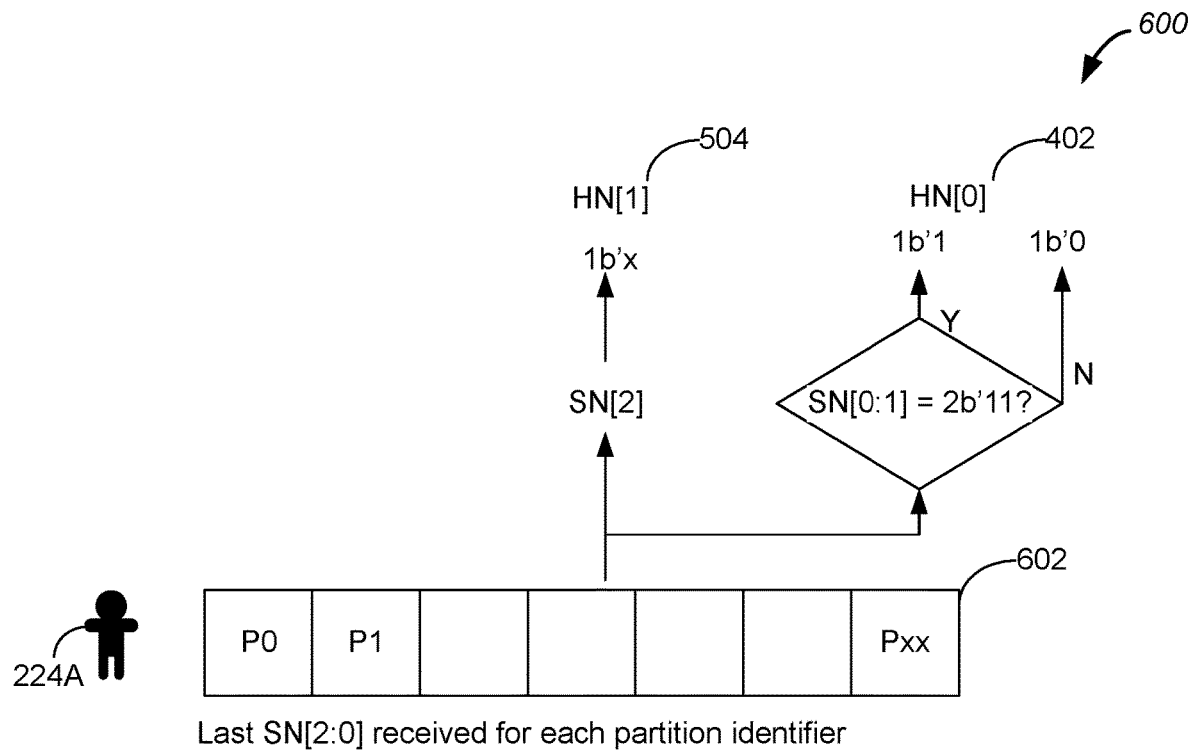
FIG. 6A illustrates an example process implemented by a cache to track memory bandwidth usage states and a current congestion level of each memory block, in accordance with some implementations.

FIG. 6A illustrates an example process 600 implemented by a cache 220 to track memory bandwidth usage states 402 of each memory block 222 and a current congestion level 504 of memory 104, in accordance with some implementations. Cache 220 is coupled to one or more processing clusters 202 and memory 104 including a plurality memory blocks 222. Cache 220 forwards a plurality of data access requests associated with a plurality of clients 224 from a processing cluster 202 to the plurality of memory blocks 222 of memory 104. Given that resources are partitioned to a plurality of resource portions to be utilized by the plurality of clients 224, each resource portion is assigned to a respective client 224 and has a respective partition identifier (ID). Cache 220 tracks memory bandwidth usage states 402 of all clients 224 for accessing all memory blocks 222 of memory 104 and current congestion levels of memory 104. For convenience, explanation of the process 600 is focused on a first client 224A associated with a respective resource portion having a respective partition ID.

In response to each of a subset of data access requests (e.g., all write requests and a subset of read requests associated with first client 224A), cache 220 receives a memory bandwidth usage state 402 (e.g., SN[0:1]) and a current congestion level 504 (e.g., SN[2]) of memory 104. Cache 220 thereby tracks a plurality of memory bandwidth usage states 402 corresponding to memory blocks 222 for first client 224A. Each memory bandwidth usage state is associated with a respective memory block 222 and indicates at least how much (e.g., 75%) of a memory access bandwidth assigned to the respective partition ID to access respective memory block 222 is used. In some implementations, each memory bandwidth usage state includes the second multibit state number SN (e.g., "11", "00", "10", and "01") received from respective memory block 222, and is converted to a flag stored in a first single bit (e.g., HN[0]) of a first multibit state number HN. For example, in some implementations, for each memory block 222, if the respective memory bandwidth usage associated with first client 224A is equal to "11", HN[0] is equal to "1", and otherwise, HN[0] is equal to "0". Cache 220 also tracks current congestion level 504 of memory 104 (e.g., SN[2]), which is converted to a second single bit (e.g., HN[1]) of the first multibit state number HN. In some implementations, cache 220 keeps a record 602 of the most recent updated memory bandwidth usage state 402 (e.g., in HN[0]) of each memory block 222 and current congestion level 504 (e.g., in HN[1]) of memory 104 in association with first client 224A.

In response to each of the subset of data access requests forwarded by cache 220 to a memory block 222 for first client 224A, cache 220 receives an update of the record 602 concerning the memory bandwidth usage state 402 and/or current congestion level 504 of memory 104 and reports them to processing cluster 202 that has made the respective data request. In some implementations, cache 220 receives the update of, and reports to processing cluster 202, the memory bandwidth usage state 402 of memory block 222 and/or current congestion level 504 of memory 104 in response to each data access request and independently of whether the data access request is a read or write request. In some implementations, cache 220 receives the update of, and reports to processing cluster 202, the memory bandwidth usage state 402 and/or current congestion level 504 of memory 104 in response to each write request only.

Figure 6B:
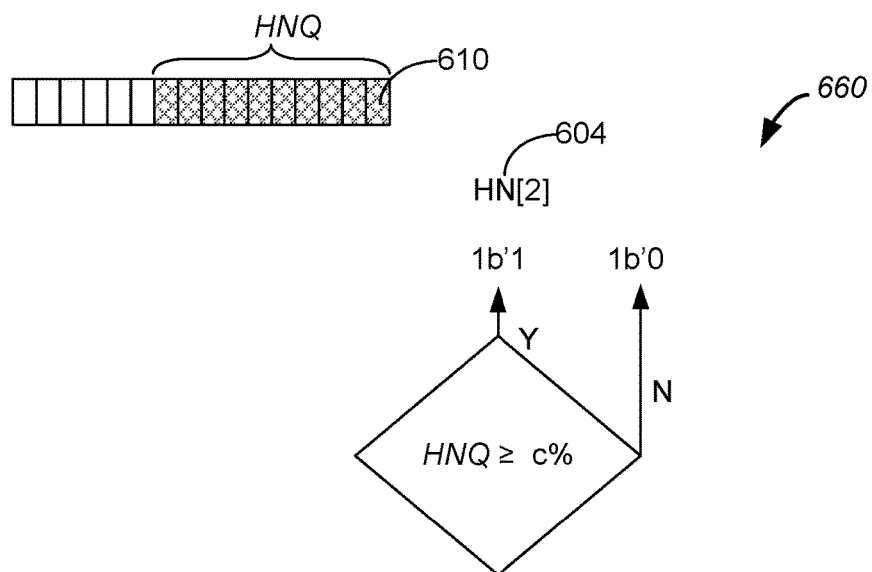
FIG. 6B illustrates an example process implemented by a cache to track a current congestion level of the cache itself, in accordance with some implementations.

FIG. 6B illustrates an example process 650 implemented by a cache 220 to track a current congestion level 604 of cache 220 itself, in accordance with some implementations. Cache 220 monitors a first total number of data access requests HNQ that are waiting in a first request queue 610 associated with cache 220, and the first request queue 610 optionally includes requests to other partition IDs than the respective partition ID of first client 224A. Current congestion level 604 of cache 220 indicates whether the first total number of data access requests HNQ exceeds a first predefined portion (e.g., c %, where c is optionally equally to 75) of a system cache capacity of this cache 220. In some implementations, current congestion level 604 is represented by a bit HN[2] of the first multibit state number HN. In some implementations, first current congestion level 604 of cache 220 is used to control throttling of prefetch requests. In some implementations, first current congestion level 604 of cache 220 is used to control qualities of prefetch requests of one or more processing clusters 202.

In response to each of the subset of data access requests forwarded by cache 220 to a memory block 222, cache 220 reports first current congestion level 604 to processing cluster 202 that has made the respective data request jointly with memory bandwidth usage state 402 of a respective memory block 222 and/or current congestion level 504 of memory 104. In some implementations, processing cluster 202 determines whether the first current congestion level 604 satisfies a throttling condition. In accordance with a determination that the first current congestion level 604 satisfies the throttling condition, processing cluster 202 throttles a plurality of prefetch requests from the plurality of resource portions, i.e., the plurality of prefetch requests are not entered into the one or more request queues 214 of processing cluster 202. In some implementations, in accordance with a determination that the first and second current congestion levels 604 and 504 satisfy a prefetch control condition, controller 216 of processing cluster 202 selects a first subset of prefetch requests having qualities that exceed a threshold quality corresponding to the prefetch control condition, including the subset of prefetch requests in a memory access request queue 214, and excludes a second subset of prefetch requests having qualities that does not exceed the threshold quality from the one or more request queues 214. More details on applications of current congestion level 604 of cache 220 are discussed below with reference to FIGS. 8 and 9.

Figure 6C:
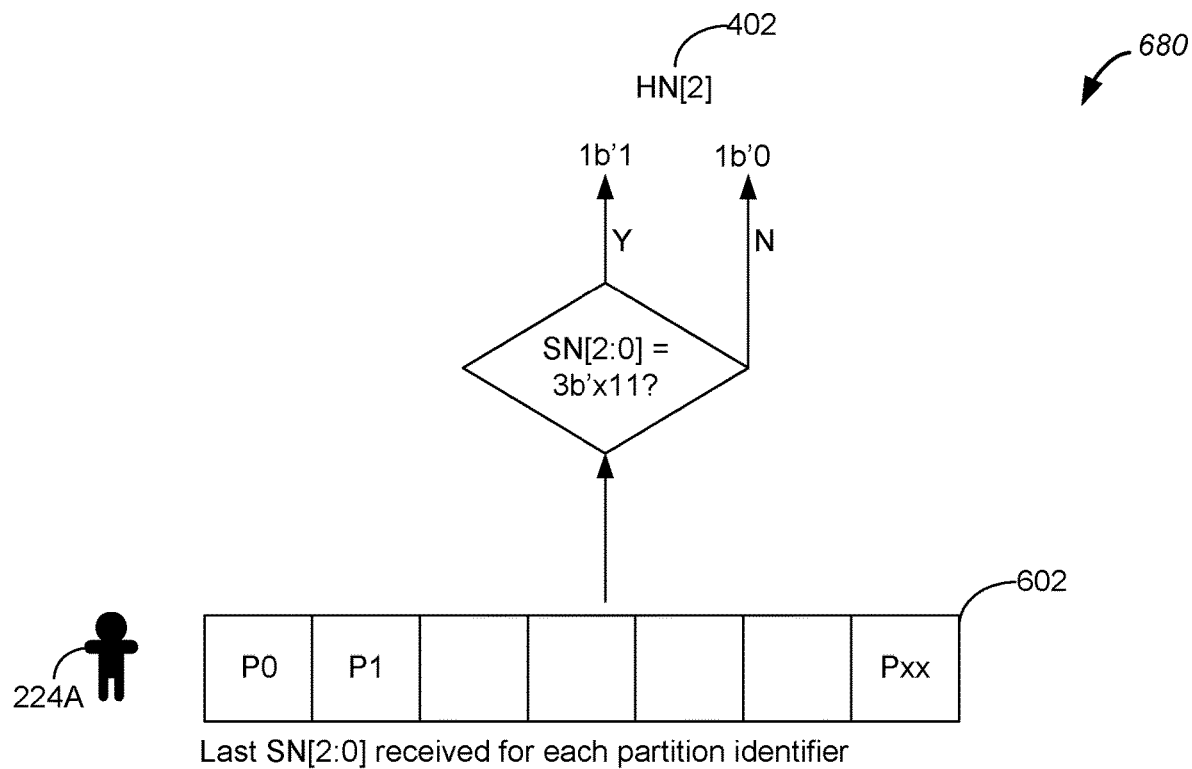
FIG. 6C illustrates another example process implemented by a cache to track memory bandwidth usage states, a current congestion level of each memory block, and a current congestion level of the cache itself, in accordance with some implementations.
Figure 6C:
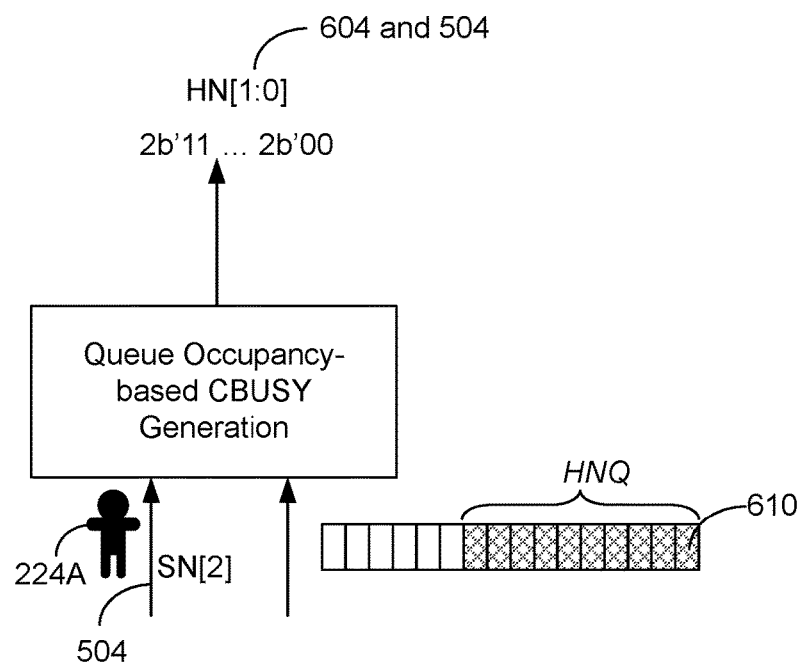

FIG. 6C illustrates another example process 680 implemented by a cache 220 to track memory bandwidth usage states 402, a current congestion level 504 of each memory block, and a current congestion level 604 of the cache 220 itself, in accordance with some implementations. Cache 220 tracks memory bandwidth usage states 402 of all clients 224 for accessing all memory blocks 222 of memory 104 and current congestion levels of memory 104. For convenience, explanation of the process 680 is focused on a first client 224A associated with a respective resource portion having a respective partition ID.

In response to each of a subset of data access requests (e.g., all write requests and a subset of read requests associated with first client 224A), cache 220 receives a memory bandwidth usage state 402 (e.g., SN[0:1]) and a current congestion level 504 (e.g., SN[2]) of memory 104. Cache 220 thereby tracks a plurality of memory bandwidth usage states 402 corresponding to memory blocks 222 for first client 224A. Each memory bandwidth usage state is associated with a respective memory block 222 and indicates at least how much (e.g., 75%) of a memory access bandwidth assigned to the respective partition ID to access respective memory block 222 is used. In some implementations, each memory bandwidth usage state 402 (e.g., SN[0:1]) includes the second multibit state number SN (e.g., "11", "00", "10", and "01") received from respective memory block 222, and is converted to a flag stored in a first single bit (e.g., HN[2]) of a first multibit state number HN. For example, in some implementations, for each memory block 222, if the respective memory bandwidth usage 402 associated with first client 224A is equal to "11", HN[2] is equal to "1", independently of whether the current congestion level 504 (e.g., SN[2]) of memory 104 is "0" or "1". Conversely, if the respective memory bandwidth usage 402 associated with first client 224A is not equal to "11", HN[2] is equal to "0". For the first client 402, the memory bandwidth usage states 402 of the memory blocks 222 are provided to the controller 216 via the first single bit (e.g., HN[2]) of the first multibit state number HN, which is further applied by the controller 216 to control requests of the first client 402 to access data stored in the memory blocks 222.

In some implementations, the first multibit state number HN further includes two additional bits HN[0] and HN[1]. Cache 220 monitors a first total number of data access requests HNQ that are waiting in a first request queue 610 associated with cache 220, and the first request queue 610 optionally includes requests to other partition IDs than the respective partition ID of first client 224A. A current congestion level 604 of cache 220 is generated based on the first total number of data access requests HNQ, and indicates whether the first total number of data access requests HNQ exceeds a first predefined portion (e.g., c %, where c is optionally equally to 75) of a system cache capacity of this cache 220. In some implementations, this current congestion level 604 of cache 220 and the current congestion level 504 (e.g., SN[2]) of memory 104 are represented by the two additional bits HN[0] and HN[1] of the first multibit state number HN. In some implementations, first current congestion level 604 of cache 220 and/or second current congestion level 504 (e.g., SN[2]) of memory 104 are used to control throttling of prefetch requests. In some implementations, first current congestion level 604 of cache 220 and/or second current congestion level 504 (e.g., SN[2]) of memory 104 are used to control qualities of prefetch requests of one or more processing clusters 202. Stated another way, cache 220 returns the first multibit state number HN including HN[0:1] to the controller 216, which uses HN[0:1] to control throttling and/or qualities of prefetch requests. More details on applications of current congestion level 604 of cache 220 are discussed below with reference to FIGS. 8 and 9.

Figures 7A, 7B, 7C:
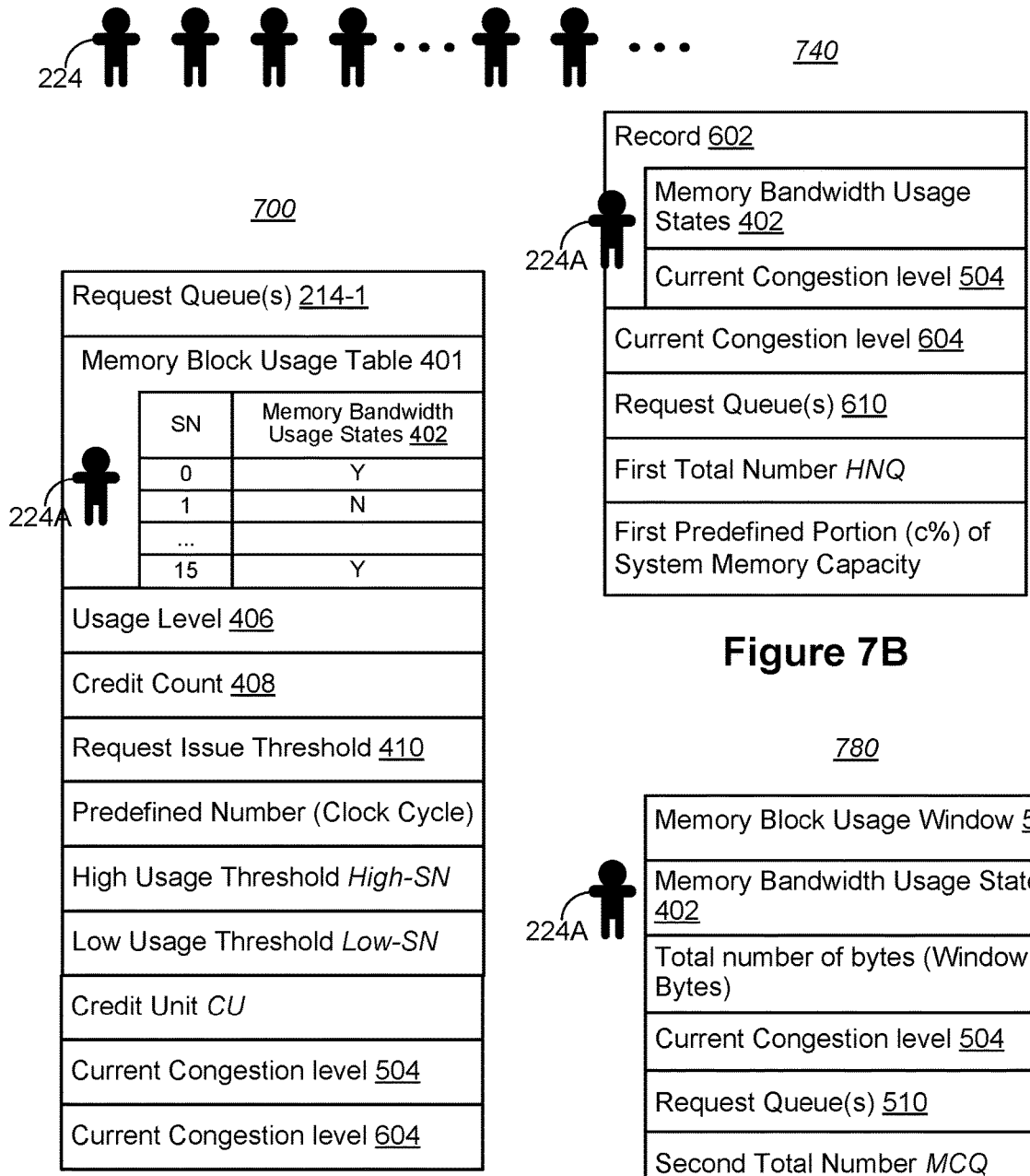
FIGS. 7A, 7B, and 7C are example data structures of data stored at a processing cluster, cache, and memory blocks for managing data access requests of a plurality of resource partitions, in accordance with some implementations, respectively.

FIGS. 7A, 7B, and 7C are example data structures of data stored at a processing cluster 202, cache 220, and memory blocks 222 for managing data access requests of a plurality of resource partitions, in accordance with some implementations, respectively. An electronic device (e.g., a server or server system) is configured to provide service to multiple clients 224, and therefore, computational and storage resources of the electronic device are partitioned into a plurality of resource portions to be utilized by the plurality of clients 224. Each resource portion is assigned to a respective client 224 and has a respective partition ID associated with the respective client 224. Processing cluster 202 has one or more request queues 214 that store a plurality of data access requests associated with the plurality of clients 224 to the plurality of memory blocks 222 of memory 104. The data structures 700, 740, and 780 are applied to manage the data access requests stored in the one or more request queues 214 of each processing cluster 202.

Referring to FIG. 7A, for each resource portion having the respective partition ID of the respective client 224 (e.g., a first client 224A), processing cluster 202 applies a memory block usage table 401 including a plurality of memory bandwidth usage states 402 for the plurality of memory blocks 222 of memory 104. Each memory bandwidth usage state 402 is uniquely associated with a respective memory block 222 and indicates at least how much of a memory access bandwidth assigned to the respective partition ID to access the respective memory block is used. Processing cluster 202 applies a usage level 406, credit count 408, and a request issue threshold 410 to dynamically control the data access requests stored in the one or more request queues 214 based on memory bandwidth usage states 402 of the memory blocks 222. Specifically, for each resource portion, usage level 406 is a combination of memory bandwidth usage states 402, and credit count 408 is adjusted (e.g., increased or decreased by a credit unit CU) based on usage level 406. In accordance with a determination that credit count 408 is greater than request issue threshold 410, a next data access request 412 associated with the respective partition ID is issued. Conversely, in accordance with a determination that credit count 408 is not greater than request issue threshold 410, credit count 408 is continued to be adjusted until next data access request 412 can be issued.

A predefined number of clock cycles and one or more usage thresholds associated with each client 224 (e.g., a high usage threshold High-SN and a low usage threshold Low-SN) are applied to control adjustment of credit count 408. After each data request associated with the respective client 224 is issued, a subset of memory bandwidth usage states 402 is updated, while usage level 406 of the respective client 224 is not updated until the predefined number of clock cycles have passed. Usage level 406 is compared with the one or more usage thresholds to determine whether credit count 408 is increased by the credit unit CU, decreased by the credit unit CU, or remains the same. Such adjustment is implemented periodically at every one or more clock cycles until the magnitude of credit count 408 triggers issuing of next data access request 412.

In some implementations, processing cluster 202 also track a current congestion level 504 of memory 104 and a current congestion level 604 of cache 220. Controller 216 of the processing cluster maintains a first congestion level history (e.g., a history 902 in FIG. 9) that includes the obtained current congestion level 604 of cache 220, and maintains a second congestion level history (e.g., a history 904 in FIG. 9) that includes current congestion level 504 of memory 104. In some situations, data access requests not satisfied by cache 220 are further sent to memory 104, and the number of outstanding in-flight requests received by memory 104 is therefore determined based on an extent to which data access requests sent to cache 220 are not satisfied by cache 220. Controller 216 causes processing cluster 202 to limit prefetch requests from processing cluster 202 based on at least one of current congestion level 604 of cache 220 and current congestion level 504 of memory 104. In some implementations, the prefetch requests from processing cluster 202 are limited based on the first congestion level history and/or the second congestion level history. More details on application of system congestion levels of cache 220 and memory 104 are explained below with reference to FIG. 9.

Referring to FIG. 7B, cache 220 is coupled between processing cluster 202 and memory blocks 222 of memory 104. Cache 220 keeps a record 602 of every client's most recent updated memory bandwidth usage states 402 (e.g., in HN[0]) for each memory block 222 and current congestion level 504 of memory 104 (e.g., in HN[1]). Cache 220 stores a current congestion level 604 of cache 220 itself. Cache 220 has a first request queue 610, and monitors a first total number of data access requests HNQ that are waiting in the first request queue 610. Current congestion level 604 of cache 220 indicates whether the first total number of data access requests HNQ exceeds a first predefined portion (e.g., c %) of a system cache capacity of this cache 220.

Referring to FIG. 7C, a memory block 222 is coupled to both processing cluster 202 and cache 220, and receives data access requests of different clients 224 from processing cluster 202 via cache 220. A memory block usage window 506 is tracked for each client 224 in memory block 222. A total number of bytes (i.e., Window Bytes) processed in window 506 for each client 224 (e.g., first client 224A) is determined and applied to derive an average data access level of the partition ID of each client 224 to memory block 222. This average data access level is used to determine each client's memory bandwidth usage state 402, i.e., how much of a memory access bandwidth assigned to the respective partition ID to access memory block 222 is used.

The memory block 222 also tracks a second request queue 510, a second total number of data access requests MCQ waiting in the queue 510, a second predefined portion of the external memory capacity, and an alternative predefined portion (e.g., x %) of the external memory capacity, and current congestion level 504 of memory 104. Current congestion level 504 indicates whether the second total number of data access requests MCQ that are waiting in the second request queue 510 exceeds the second predefined portion (e.g., 75%) of an external memory capacity. Throttling of the prefetch requests in processing cluster 202 is controlled in part by current congestion level 504 of memory 104. Additionally, in some implementations, each client's memory bandwidth usage state 402 is determined based partially on whether the second total number of data access requests MCQ that are waiting in the second request queue 510 exceeds the alternative predefined portion (e.g., 75%) of the external memory capacity. For example, memory bandwidth usage state 402 is equal to "11", when the average data access level to this specific memory block 222 and the second total number of data access requests MCQ waiting in the second request queue 510 are both high (e.g., when the average data access level to this specific memory block 222 has exceeded the predefined threshold portion (e.g., 100%) of the predefined memory access bandwidth and the second total number of data access requests MCQ exceeds the alternative predefined portion (e.g., 75%) of the external memory capacity).

Figure 8:
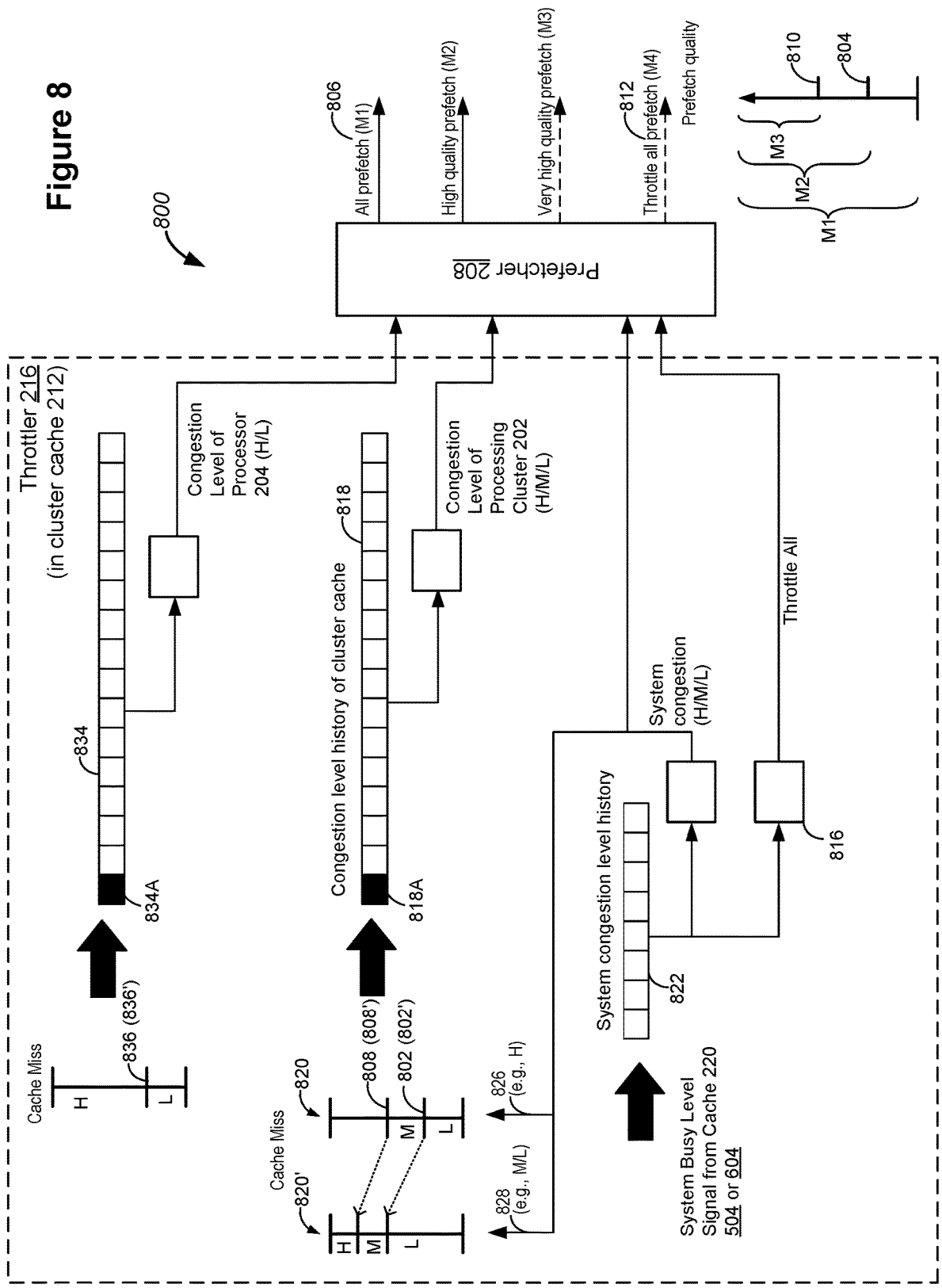
FIG. 8 illustrates an example method of determining a congestion level of a processing cluster for controlling cache prefetching in the processing cluster, in accordance with some implementations.

FIG. 8 illustrates an example method 800 of determining a congestion level for controlling cache prefetching in a processing cluster 202 (e.g., first processing cluster 202-1 of FIG. 2), in accordance with some implementations. In this processing cluster 202, controller 216 of cluster cache 212 determines a congestion level of processing cluster 202 based on an extent to which data access requests sent from processors 204 in processing cluster 202 to cluster cache 212 are not satisfied by cluster cache 212, and controls prefetch requests from a prefetcher 208 associated with a first respective processor 204-1 in processing cluster 202. Specifically, in accordance with a determination that the congestion level of processing cluster 202 satisfies first congestion criteria that require that the congestion level of processing cluster 202 is above a first cluster congestion threshold 802, controller 216 causes first respective processor 204-1 of the one or more processors 204 to limit prefetch requests to cluster cache 212 to prefetch requests of at least a first threshold quality 804. Conversely, in accordance with a determination that the congestion level of processing cluster 202 does not satisfy the first congestion criteria, controller 216 forgoes causing the one or more processors 204 (including the first respective processor 204-1) to limit (806) prefetch requests to cluster cache 212 to prefetch requests of at least the first threshold quality 804. Stated another way, when the congestion level of processing cluster 202 is below first cluster congestion threshold 802, controller 216 does not limit prefetch requests for processing cluster 202 in a first prefetch throttling mode M1; and when the congestion level of processing cluster 202 is beyond cluster congestion threshold 802, controller 216 causes first respective processor 204-1 to limit prefetch requests to prefetch requests of at least the first threshold quality 804, i.e., to limit prefetch requests to high quality prefetches in a second prefetch throttling mode M2.

In some implementations, in accordance with a determination that the congestion level of processing cluster 202 satisfies second congestion criteria, different from the first congestion criteria, that require that the congestion level of processing cluster 202 is above a second cluster congestion threshold 808 that is above the first cluster congestion threshold 802, controller 216 causes the first respective processor 204-1 to limit prefetch requests to prefetch requests of at least a second threshold quality 810 that is higher than the first threshold quality 804. In some implementations, if the congestion level of processing cluster 202 is above second cluster congestion threshold 808 (e.g., indicating high congestion as opposed to low or medium congestion), controller 216 causes at least a respective processor 204 (e.g., first respective processor 204-1) of processing cluster 202 to operate in a third prefetch throttling mode M3 in which prefetching is limited to prefetches of at least the second threshold quality 810 (e.g., allowing only prefetches that are at least very high quality prefetches). In contrast, in first prefetch throttling mode M1, prefetching is not limited, and in a second prefetch throttling mode M2, prefetching is limited to prefetches having a quality between the first and second threshold qualities 804 and 810 (e.g., allowing prefetches that are at least high quality prefetches).

In some implementations, in accordance with a determination that the congestion level of processing cluster 202 satisfies third congestion criteria, controller 216 causes the first respective processor 204-1 to forgo transmitting (812) prefetch requests to the cache entirely, e.g., without regard to a quality of a requested prefetch. In some implementations, the third congestion criteria include (1) a first requirement that the congestion level of processing cluster 202 is above the cluster congestion threshold 808 and (2) a second requirement that a system congestion level history 822 of electronic device 200 satisfies a first system congestion condition 816 (e.g., 75% of a system congestion level history is high). The system congestion level history 822 is monitored by controller 216 based on a system busy level signal (i.e., a current congestion level 604) received from cache 220, thereby indicating a congestion level of cache 220. For example, the system congestion level history 822 is filled with "H" or "L" based on a plurality of sampled values of the system busy level signal. The first system congestion condition 816 requires that 75% or more of the system congestion level history 822 is filled with "H" to enable the fourth prefetch throttling mode M4 (i.e., the throttle all mode). Conversely, in some implementations, controller 216 disables and resets the fourth prefetch throttling mode M4 when a second system congestion condition is satisfied, e.g., when 25% or less of the system congestion level history 822 is filled with "H".

In some implementations, the extent to which the plurality of data access requests, sent from processors 204 in processing cluster 202 to cluster cache 212, are not satisfied by cluster cache 212 is represented by one or more historical congestion levels for processing cluster 202. The one or more historical congestion levels are maintained in a congestion level history 818 for processing cluster 202. The congestion level of processing cluster 202 is determined based on a portion or all of the one or more historical congestion levels in the congestion level history 818. In an example, each historical congestion level in congestion level history 818 corresponds to a distinct respective period of time and represents the extent to which data access requests were not satisfied by the cache during the respective period of time. The historical congestion level of processing cluster 202 may have been periodically sampled and stored in the congestion level history 818. In some implementations, a respective historical congestion level (or each respective historical congestion level) has a value selected from a predetermined set of congestion level values. For example, where two congestion levels are used, a respective historical congestion level has a first congestion level value (e.g., "low") or a second congestion level value (e.g., "high"), e.g., defined based on first cluster congestion threshold 802. In another example, where three congestion levels are used, a respective historical congestion level has a first congestion level value (e.g., "low"), or a second congestion level value (e.g., "medium"), or a third congestion level value (e.g., "high"), e.g., defined based on cluster congestion thresholds 802 and 808. One of ordinary skill in the art will recognize that any number of congestion levels may be used, and any number of distinct congestion level values used accordingly.

In some implementations, a current cluster congestion level 818A of processing cluster 202 is determined based on a comparison with congestion thresholds 802 and 808, and stored into congestion level history 818, e.g., in place of the oldest historic congestion level stored therein. The congestion level of processing cluster 202 is determined based on a portion or all of the congestion level history 818 including the current cluster congestion level 818A of processing cluster 202. For example, in accordance with a determination that the current cluster congestion level (e.g., equal to "high") 818A is greater than the congestion level of processing cluster 202 (e.g., equal to "medium"), the congestion level of processing cluster 202 is increased by one level or to the current cluster congestion level 818A. In accordance with a determination that all existing historic congestion levels (e.g., equal to "medium" or "low") in history 818 are lower than the congestion level of processing cluster 202 (e.g., equal to "high"), the congestion level of the processing level 202 is reduced by one level. Otherwise, the congestion level of the processing level 202 does not change. The current cluster congestion level 818 is the most recent cluster congestion level measured based on cluster congestion thresholds 802 and 808. Alternatively, in some implementations, the first and second cluster congestion thresholds 802 and 808 are applied in conjunction with a historical congestion threshold (e.g., 10% of congestion level history 818). For example, the congestion level of processing cluster 202 satisfies the first congestion criteria if a portion (e.g., 75%) of the congestion level history 818 is above the first cluster congestion threshold 802 (i.e., has a value of "medium" or "high") and exceeds the historical congestion threshold (e.g., 10%).

It is noted that in some implementations, the congestion level of processing cluster 202 is determined based on an extent to which the plurality of data access requests sent from the one or more processors 204 in processing cluster 202 to cluster cache 212 are not satisfied by the cache 212, without regard to which of the one or more processors 204 sent the plurality of data access requests. That said, the congestion level of processing cluster 202 is determined without regard to an extent to which data access request(s) from a specific processor of the one or more processors 204 are not satisfied by cluster cache 212.

In some implementations, determining the congestion level of processing cluster 202 includes comparing the number of data access requests, sent from the one or more processors 204 in processing cluster 202 to cluster cache 212, that are not satisfied by cluster cache 212 (e.g., also called cache misses) to one or more cache miss thresholds. Each cluster congestion threshold 802 and 808 includes a respective cache miss threshold 802' or 808'. In some implementations, the number of cache misses by processing cluster 202 is compared to the one or more cache miss thresholds 802' or 808' to determine a cache miss value (e.g., low, medium, high, etc.), which is taken into account when determining the congestion level of processing cluster 202. For example, if the number of cache misses by processing cluster 202 is below a first cache miss threshold 802', a first cache miss value (e.g., a low value) is taken into account when determining the congestion level of processing cluster 202. In another example, if the number of cache misses by processing cluster 202 is above the first cache miss threshold 802', a second cache miss value (e.g., a medium or high value) is taken into account when determining the congestion level of processing cluster 202. In yet another example, if the number of cache misses by processing cluster 202 is above a second cache miss threshold 808', a third cache miss value (e.g., a high value) is taken into account when determining the congestion level of processing cluster 202. In some implementations, the cache miss value is taken into account in the context of one or more historical congestion levels in a congestion level history 818 for processing cluster 202. In an example, the cache miss value defines the historical congestion levels stored in the congestion level history 818 for processing cluster 202.

Further, in some implementations, the one or more cache miss thresholds (i.e., cache miss thresholds 802' and 808') are determined based on a system congestion level (e.g., 910 in FIG. 9) of electronic device 200. In some implementations, a first set 820 of one or more cache miss thresholds is used in accordance with a determination that the system congestion level is a first congestion value 826, and a different second set 820' of one or more cache miss thresholds is used in accordance with a determination that the system congestion level is a different second congestion value 828. If needed, additional different sets of one or more cache miss thresholds may be used for any number of different system congestion values. In some implementations, second congestion value 828 is lower than first congestion value 826, and each cache miss threshold 802' or 808' is adjusted to a higher value in association with the second congestion value 828, because where system congestion is low, higher amounts of cluster congestion may be tolerated. For example, first cache miss threshold 802' is adjusted from 30% to 50%, when the system congestion level drops from first congestion value 826 to second congestion value 828. On the other hand, the higher the system congestion level, the lower the one or more cache miss thresholds of the set 820, because where system congestion is already high, lower amounts of cluster congestion (e.g., of processing cluster 202) may warrant throttling than where system congestion is low.

In some implementations, the plurality of data access requests include all data access requests sent from the one or more processors 204 to cluster cache 212 within a predefined period of time, i.e., include all demand requests and all prefetch requests.

In some implementations, controller 216 determines that a congestion level of a respective processor 204-1 or 204-N is below a processor congestion threshold 836 that is different from the congestion threshold 802 or 808 used for cluster cache 212, regardless of the congestion level of processing cluster 202, and forgoes limiting prefetch requests from respective processor 204-1 or 204-N to cluster cache 212. That said, in these implementations, the prefetch requests from respective processor 204-1 or 204-N are not limited based on the cluster congestion level and system congestion level, when the congestion level of the respective processor is below the processor congestion threshold 836 (e.g., equal to "L"). Conversely, if the congestion level of respective processor 204-1 or 204-N is beyond processor congestion threshold 836 (e.g., equal to "H"), the prefetch requests from respective processor 204-1 or 204-N to cluster cache 212 are limited or throttled based on the congestion levels of the processing cluster and system. The congestion level of respective processor 204-1 or 204-N is determined based on an extent to which data access requests sent from the respective processor 204-1 or 204-N to cluster cache 212 are not satisfied by cluster cache 212, e.g., independently of whether data access requests sent to cluster cache 212 from any processors other than the respective processor 204-1 or 204-N are satisfied by cluster cache 212.

Stated another way, in some implementations, the first congestion criteria further require that the congestion level of a respective processor 204 be above processor congestion threshold 836 in order for controller 216 to limit prefetch requests from the respective processor. In some implementations, the determination whether to limit prefetch requests from a respective processor based on whether the congestion level of the respective processor is above the processor congestion threshold 836 takes priority over other determinations regarding whether to limit prefetch requests (e.g., with respect to the first congestion criteria, second congestion criteria, and/or third congestion criteria concerning the congestion level of processing cluster 202).

In some implementations, controller 216 maintains a processor congestion level history 834 to store historical congestion levels of each processor 204. The prefetch requests from the respective processor is limited based on the congestion level of processor 204 that is determined based on at least a portion of congestion level history 834 of this processor 204. A current congestion level of processor 204 is recorded and compared with processor congestion threshold 836, and one of a plurality of values (e.g., "L" and "H") is determined based on a comparison result and stored as a current congestion level 834A in congestion level history 834 of this processor 204 (e.g., in place of the oldest cache miss level in history 834). In accordance with a determination that the current congestion level 834A of processor 204 indicates a higher congestion level than the congestion level of processor 202, the congestion level of processor 202 is increased by one level or to the current congestion level 834A. In accordance with a determination that the entire congestion level history 834 of processor 204 is lower than the congestion level of processor 202, the congestion level of processor 202 is reduced by one level or to the lower congestion level, e.g., from "H" to "L".

Further, in some implementations, processor congestion threshold 836 includes a processor cache miss threshold 836'. Determining the congestion level of processor 204 includes comparing a number of data access requests, sent from respective processor 204 to cluster cache 212, that are not satisfied by cluster cache 212 (i.e., cache misses) to a processor cache miss threshold 836. For example, if the number of cache misses for processor 204 is below cache miss threshold 836', a first cache miss value (e.g., a low value) is taken into account when determining the congestion level of processor 204; if the number of cache misses for processor 204 is above cache miss threshold 836', a second cache miss value (e.g., a medium or high value) is taken into account when determining the congestion level of processor 204. Specially, in some implementations, a current cache miss is determined for a current number of data access requests that are not satisfied by cluster cache 212 during a sample duration of time. The current cache miss is compared with cache miss threshold 836, and one of a plurality of cache miss values (e.g., "L" and "H") is determined based on a comparison result and stored as a current cache miss level 834A in congestion level history 834 of this processor 204 (e.g., in place of the oldest cache miss level in history 834). In accordance with a determination that the current cache miss level 834A of processor 204 indicates a higher congestion level than the congestion level of processor 202, the congestion level of processor 202 is increased by one level or to the current cache miss level 834A. In accordance with a determination that congestion level history 834 of processor 204 indicates a lower congestion level than the congestion level of processor 202 (e.g., all cache miss levels in the congestion level history 834 are lower than the congestion level of processor 202), the congestion level of processor 202 is reduced by one level or to the lower congestion level, e.g., from "H" to "L".

In some implementations, the electronic device 200 includes a second processing cluster 202-M having one or more second processors 206 different from the one or more processors 204 of processing cluster 202-1. Controller 216-1 limits prefetch requests by processing cluster 202-1, independently of whether prefetch requests from one or more second processors 206 of second processing cluster 202-M are limited. In some implementations, prefetching by second processing cluster 202-M is controlled in accordance with any of the methods for controlling prefetching described herein with respect to processing cluster 202-1. In some implementations, prefetching by second processing cluster 202-M may indirectly affect prefetching by processing cluster 202-1 by indirectly affecting system congestion; however, prefetching or prefetch throttling of second processing cluster 202-M is not directly taken into account in determining whether to limit prefetching by processing cluster 202-1.

FIG. 9 illustrates an example method 900 of determining a system congestion level for controlling cache prefetching in an individual processing cluster 202 (e.g., first processing cluster 202-1), in accordance with some implementations. A data access request of a processor 204 of processing cluster 202 is sent to cluster cache 212. If this data access request is not satisfied by cluster cache 212, it continues to be sent to cache 220 that is shared by processing cluster 202 with one or more other processing clusters. If the data access request is not satisfied by cache 220, it is further sent to memory 104. The system congestion level indicates how many data access requests from processors 204 are sent to cache 220 or memory 104. Specifically, a first congestion level history 902 and a second congestion level history 904 are maintained by controller 216. A current congestion level 604 of cache 220 is obtained based on a number of outstanding in-flight requests received by cache 220, and stored in the first congestion level history 902. A current congestion level 504 of memory 104 is obtained based on a number of outstanding in-flight requests received by memory 104, and stored in second congestion level history 904. In some implementations, information of the outstanding in-flight requests that are not satisfied by cache 220 or memory 104 are determined based on system busy level signals (i.e., current congestion levels 504 and 604) that are received from cache 220 and memory 104 in response to the data access requests sent to cache 220 and memory 104, respectively.

The current congestion levels 504 and 604 of memory 104 and cache 220 are monitored with respective sampling rates that are optionally equal to or different from each other. First and second congestion level histories 902 and 904 can store up to respective limited numbers of historical congestion levels, and the respective limited numbers are optionally equal to or different from each other. In an example, the first and second congestion level histories 902 and 904 track a first integer number of historical congestion levels of cache 220 and a second integer number of historical congestion levels of memory 104. The first and second integer numbers are optionally equal to or distinct from each other.

In some implementations, controller 216 is configured to cause processing cluster 202 to limit prefetch requests from processing cluster 202 in accordance with a highest throttling level 920 based on first congestion level history 902 of cache 220 including the obtained current congestion level 604 of cache 220. In some situations, highest throttling level 920 is determined without regard to the obtained current congestion level 504 of memory 104. In some implementations, whether prefetch requests from processing cluster 202 are limited in accordance with highest throttling level 920 is based on the obtained current congestion level 604 of cache 220, on first congestion level history 902 of cache 220, and/or on a first congestion level of cache 220 that is determined based on at least a portion of first congestion level history 902 of cache 220. For example, highest throttling level 920 may be determined with reference to a first system congestion condition 816 (e.g., at least a predefined percentage of first congestion level history 902 is equal to "H"). In some implementations, congestion of cache 220, but not congestion of memory 104, determines whether prefetch requests from processing cluster 202 are limited in accordance with highest throttling level 920. Additionally, in some implementations, controller 216 is configured to cause processing cluster 202 to limit prefetch requests in accordance with highest throttling level 920 based on the congestion levels of both processing cluster 202 and cache 220. For example, highest throttling level 920 is applied to limit prefetching, when the congestion level of processing cluster 202 is above the cluster congestion threshold 808 and first congestion level history 902 of cache 220 satisfies first system congestion condition 816. In some implementations, highest throttling level 920 corresponds to a throttle all mode M4 in which no prefetching is permitted (812).

Further, in some implementations, controller 216 is configured to cause processing cluster 202 to limit prefetch requests from processing cluster 202 in accordance with highest throttling level 920 based on first congestion level history 902 of cache 220, e.g., based on a subset of first congestion level history 902 and/or second congestion level history 904. The subset of first congestion level history 902 includes less than all or all congestion level stored history 902. In an example, controller 216 causes processing cluster 202 to limit prefetch requests from processing cluster 202 based on one or more most-recently determined and recorded congestion levels of cache 220. In some implementations, the subset of first congestion level history 902 has the same number of recorded historical congestion levels (e.g., the same number of samples or entries) as second congestion level history 904.

In some implementations, controller 216 is configured to cause processing cluster 202 to limit prefetch requests from processing cluster 202 in accordance with highest throttling level 920, e.g., to activate highest throttling level 920, based on a determination that first congestion level history 902 includes more than a first threshold number of determined congestion levels indicating a respective congestion level of cache 220 (e.g., a high congestion level "H" that is above a system congestion threshold). For example, highest throttling level 920 is activated if first congestion level history 902 (or the subset of first congestion level history 902) includes greater than a first threshold number (or alternatively, first threshold percentage) of instances where the high congestion level (e.g., "H") was recorded for cache 220.

In some implementations, controller 216 is configured to cause processing cluster 202 to forgo limiting prefetch requests from processing cluster 202 in accordance with highest throttling level 920, e.g., to deactivate highest throttling level 920, based on a determination that first congestion level history 902 includes less than a second threshold number of determined congestion levels indicating the respective congestion level of cache 220 (e.g., the high congestion level "H" that is above the system congestion threshold). For example, highest throttling level 920 is deactivated if first congestion level history 902 (or the subset of first congestion level history 902) includes less than a second threshold number (or alternatively, second threshold percentage) of instances where a high congestion level (e.g., "H") was recorded for cache 220. In some implementations, the first threshold number is the same as the second threshold number (or alternatively, the first threshold percentage is the same as the second threshold percentage). In some implementations, the first threshold number is different from (e.g., greater than) the second threshold number (or alternatively, the first threshold percentage is different from the second threshold percentage). In an example, both the first and second threshold percentages are 50%. In another example, the first threshold percentage is 75%, and the second threshold percentage is 25%.

In some implementations, limiting prefetch requests from processing cluster 202 in accordance with highest throttling level 920 includes limiting all prefetch requests from processing cluster 202, e.g., in a throttle all mode M4. In accordance with highest throttling level 920, no prefetch requests from processing cluster 202 are permitted.

In some implementations, controller 216 determines a first congestion level of cache 220 and a second congestion level of memory 104. In accordance with a determination that the obtained current congestion level 604 of cache 220 indicates a higher congestion level than the first congestion level, controller 216 increases the first congestion level, e.g., to a next-higher level in a set of possible congestion levels. Conversely, in accordance with a determination that first congestion level history 902 indicates a lower congestion level than the first congestion level (e.g., the entire first congestion level history 902 is lower than the first congestion level), controller 216 decreases the first congestion level. For example, in accordance with a determination that no entry in first congestion level history 902 indicates a congestion level higher than the current value of the first congestion level, controller 216 decreases the first congestion level, e.g., to a next-lower level in the set of possible congestion levels. Similarly, in some implementations, in accordance with a determination that the obtained current congestion level 504 of memory 104 indicates a higher congestion level than (e.g., a current value of) the second congestion level, controller 216 increases the second congestion level, e.g., to a next-higher level in the set of possible congestion levels. In accordance with a determination that second congestion level history 904 indicates a lower congestion level than the second congestion level (e.g., the entire second congestion level history 904 is lower than the second congestion level), controller 216 decreases the second congestion level. For example, in some implementations, in accordance with a determination that no entry in second congestion level history 904 indicates a congestion level higher than the current value of the second congestion level, controller 216 decreases the second congestion level, e.g., to a next-lower level in the set of possible congestion levels. As such, controller 216 causes processing cluster 202 to limit prefetch requests from processing cluster 202 based on the first congestion level and the second congestion level, and the first congestion level and the second congestion level are taken into account in determining whether to limit prefetch requests in accordance with a respective throttling level that is below a highest throttling level.

In some implementations, first system congestion level 906 is determined based on the obtained current congestion level 604 of cache 220, on first congestion level history 902 of cache 220, and/or on the first congestion level of cache 220 that is determined based on at least a portion of first congestion level history 902 of cache 220. A second system congestion level 908 is determined based on the obtained current congestion level 504 of memory 104, on second congestion level history 904 of memory 104, and/or on a second congestion level of memory 104 that is determined based on at least a portion of second congestion level history 904 of memory 104. Congestion levels 906 and 908 are combined to generate a combined system congestion level 910 having two or more congestion values, such as first congestion value 826 and second congestion value 828, which are applied to determine different cache miss thresholds (i.e., cache miss thresholds 802' and 808'). In some implementations, the combined system congestion level 910 is equal to a greater one of congestion level 906 of cache 220 and congestion level 908 of memory 104. For example, if congestion level 906 is "L" and congestion level 908 is "H", the combined system congestion level 910 is "H". If congestion level 906 is "H" and congestion level 908 is "L", the combined system congestion level 910 is still "H".

It should be understood that the particular order in which the operations in FIGS. 8 and 9 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 800 and 900 (e.g., FIGS. 8 and 9) are also applicable in an exchangeable manner. For brevity, these details are not repeated here.

FIG. 10 is a flow chart of a method 1000 of managing memory accesses to a memory 104 by an electronic device, in accordance with some implementations. The electronic device includes (1002) one or more processing clusters 202 and a plurality of memory blocks 222 of memory 104. Each processing cluster 202 includes one or more respective processors 204 and is coupled to at least one of memory blocks 222. In some embodiments, each processing cluster 202 has a controller 216 configured to implement the method 1000. In some embodiments, the electronic device includes a non-transitory computer-readable medium, having instructions stored thereon, which when executed by the controller 216 of the electronic device cause the controller to implement the method 1000.

In accordance with the method 1000, the electronic device partitions (1004) resources of the electronic device into a plurality of resource portions to be utilized by a plurality of clients. Each resource portion is assigned to a respective client and having a respective ID. The electronic device receives (1006) a plurality of data access requests associated with the plurality of clients 224 to the plurality of memory blocks 222. In some implementations, the data access requests include both demand requests and prefetch requests. For each resource portion having the respective partition ID (1008), each processing cluster 202 tracks (1010) a plurality of memory bandwidth usage states 402 corresponding to memory blocks 222. Each memory bandwidth usage state 402 is associated (1012) with a respective memory block and indicates at least how much of a memory access bandwidth assigned to the respective partition ID to access respective memory block 222 is used. Processing cluster 202 determines (1014) a usage level 406 associated with the respective partition ID from the plurality of memory bandwidth usage states 402, adjusts (1016) a credit count 408 based on usage level 406, compares (1018) the adjusted credit count 408 with a request issue threshold 410, and in accordance with a determination that the credit count is greater than the request issue threshold, issues (1020) a next data access request 412 associated with the respective partition ID in a memory access request queue 214. In some situations, for each resource portion having the respective partition ID, in accordance with a determination that credit count 408 is less than request issue threshold 410, processing cluster 202 suspends from issuing any data access request from the memory access request queue 214 of the respective partition ID until credit count 408 is adjusted to be greater than request issue threshold 410.

In some implementations, for each resource portion having the respective partition ID, processing cluster 202 updates the one or more of the plurality of memory bandwidth usage states 402 in response to a prior data access request (e.g., request 404A) that is issued immediately prior to next data access request 412. After a predefined number of clock cycles following the update of the one or more of the plurality of memory bandwidth usage states, usage level 406 is determined from the plurality of memory bandwidth usage states 402. After the predefined number of clock cycles following the update of the one or more of the plurality of memory bandwidth usage states and until the next data access request is issued, credit count 408 is adjusted and compared with request issue threshold 410 periodically, e.g., within each subsequent clock cycle.

In some implementations, after each of the plurality of data access requests is issued, processing cluster 202 receives a respective response from a respective memory block associated with the issued data access request directly or indirectly, and updates the respective memory bandwidth usage state 502 corresponding to respective memory block 222 associated with the issued data access request.

In some implementations, in accordance with a determination that the usage level is equal to or greater than a high usage threshold, processing cluster 202 reduces credit count 408 by a respective credit unit CU corresponding to the respective partition ID. In accordance with a determination that the usage level is equal to or less than a low usage threshold, processing cluster 202 increases credit count 408 by the respective credit unit CU In accordance with a determination that the usage level is between the high usage threshold and the low usage threshold, processing cluster 202 maintains credit count 408.

In some implementations, for each resource portion having the respective partition ID, each of the plurality of memory bandwidth usage states 402 includes a respective multibit state number. Processing cluster 202 determines how many of the respective multibit state numbers of the memory bandwidth usage states are equal to a predefined value (e.g., "11").

In some implementations, for each resource portion having the respective partition ID, each of the plurality of memory bandwidth usage states 402 is represented by a flag indicating whether an average data access level of the respective memory block has exceeded a predefined threshold portion of the predefined memory access bandwidth assigned to the respective partition ID to access the respective memory block. Further, in some implementations, for each resource portion having the respective partition ID, usage level 406 is represented by a total number of memory blocks for each of which the flag has a first value (e.g., "Y"). Additionally, in some implementations, for a first memory block 222A, the flag has the first value. For first memory block 222A, processing cluster 202 monitors a second total number of data access requests that are waiting in a second request queue 510 of the plurality of memory blocks. In accordance with a determination (a) that a first average data access level exceeds a first predefined threshold portion of a first predefined memory access bandwidth assigned to the respective partition ID to access the first memory block and (b) that the second total number of data access requests MCQ exceeds an alternative predefined portion of an external memory capacity, processing cluster 202 determines that the flag representing a first memory bandwidth usage state of the first memory block has the first value.

Further, in some implementations, for a first memory block 222A, the flag has the first value (e.g., "Y"). For first memory block 222A, in accordance with a determination (a) that a first average data access level exceeds a first predefined threshold portion of a first predefined memory access bandwidth assigned to the respective partition ID to access the first memory block and (b) that the first predefined memory access bandwidth is enforced, processing cluster 202 determines that the flag representing a first memory bandwidth usage state 402 of first memory block 222A has the first value (e.g., "Y").

In some implementations, for each resource portion having the respective partition ID, processing cluster 202 sends each read or write request of the plurality of data access requests to a respective memory block 222 via first memory (e.g., cache 220) associated with the one or more processing clusters 202 and distinct from memory blocks 222. In response to each read request issued from the respective partition ID to a respective memory block 222, processing cluster 202 updates the respective memory bandwidth usage state 402 of the respective memory block 222 from the respective memory block 222, directly with a data item requested by the read request or indirectly via the first memory. In response to each write request issued from the respective partition ID to the respective memory block, processing cluster 202 updates the respective memory bandwidth usage state 402 associated with respective memory block 222 from the first memory. The plurality of memory blocks are configured to receive data access requests sent from the one or more processing clusters 202 to the first memory that are not satisfied by the first memory.

In some implementations, the electronic device further includes first memory (e.g., cache 220) configured to receive the plurality of data access requests and pass a subset of unsatisfied data access requests to the memory blocks 222. Processing cluster 202 obtains a first current congestion level 604 of the first memory indicating whether a first total number of data access requests that are waiting in a first request queue 610 of the first memory exceeds a first predefined portion of a system cache capacity, and a second current congestion level 504 of the plurality of memory blocks indicating whether a second total number of data access requests that are waiting in a second request queue 510 of the plurality memory blocks exceeds a second predefined portion of an external memory capacity. Further, in some implementations, the plurality of data access requests include a plurality of prefetch requests. In accordance with a determination that the first current congestion level 604 satisfies a throttling condition, the plurality of prefetch requests are throttled from the plurality of resource portions. Additionally, in some implementations, the plurality of data access requests include a plurality of prefetch requests. In accordance with a determination that the first and second current congestion levels satisfy a prefetch control condition, processing cluster 202 selects a first subset of prefetch requests having qualities that exceed a threshold quality corresponding to the prefetch control condition, includes the subset of prefetch requests in the memory access request queue, and excludes a second subset of prefetch requests having qualities that does not exceed the threshold quality from the memory access request queue 214.

In some implementations, the electronic device further includes first memory (e.g., cache 220), and the plurality of memory bandwidth usage states 402 corresponding to memory blocks 222 are tracked at one or more processing clusters 202. For each resource portion having the respective partition ID, at each memory block 222, an average data access level of the respective partition ID to respective memory block 222 is tracked in real time, and respective memory bandwidth usage state 402 associated with respective memory block 222 is determined based on the average data access level. The respective memory bandwidth usage state 402 is reported to the first memory and the one or more processing clusters 202 in response to the data access requests received from the one or more processing clusters 202. The first memory receives the respective memory bandwidth usage state 402 reported by the plurality of memory blocks 222 in response to the plurality of the data access requests received from the one or more processing clusters 202.

FIG. 11 is a flow chart of a method 1100 of tracking memory bandwidth usage at a first memory (e.g., cache 220) coupled to one or more processing clusters 202 and a plurality of memory blocks 222, in accordance with some implementations. The method 1100 is implemented (1102) at the first memory. The first memory is coupled to one or more processing clusters 202 and a plurality of memory blocks 222 in an electronic device. The first memory forwards (1104) a plurality of data access requests associated with a plurality of clients 224 to a plurality of memory blocks 222. Resources of the electronic device are partitioned (1106) to a plurality of resource portions to be utilized by the plurality of clients, and each resource portion is assigned to a respective client and having a respective partition ID. For each resource portion having the respective partition ID (1108), the first memory identifies (1110) a subset of data access requests associated with the respective partition ID for accessing memory blocks 222, and tracks (1112) a plurality of memory bandwidth usage states 402 corresponding to memory blocks 222. Each memory bandwidth usage state 402 is associated (1114) with a respective memory block and indicates at least how much of a memory access bandwidth assigned to the respective partition ID to access the respective memory block is used. In response to each of the subset of data access requests (1116), the first memory determines (1118) the respective data access request is to access a corresponding memory block, receives (1120) a memory bandwidth usage state of the corresponding memory block, and reports (1122) the memory bandwidth usage state of the corresponding memory block to the one or more processing clusters.

In some implementations, the first memory monitors a first total number of data access HNQ requests that are waiting in a first request queue 610 of the first memory, and determines a first current congestion level 604 (i.e., HN[2]) indicating whether the first total number of data access requests exceeds a first predefined portion of a system cache capacity. In response to each of the subset of data access requests, the first memory reports the first current congestion level 604 (i.e., HN[2]) jointly with the memory bandwidth usage state 502 of the corresponding memory block to the one or more processing clusters 202. Further, in some implementations, at the one or more processing clusters 202, in accordance with a determination that the first current congestion level 604 (i.e., HN[2]) satisfies a throttling condition, a plurality of prefetch requests from the plurality of resource portions are throttled.

In some implementations, in response to each of the subset of data access requests, the first memory updates, from the corresponding memory block, a second current congestion level 504 (i.e., SN[2]) indicating whether a second total number of data access requests that are waiting in a second request queue of the plurality of memory blocks exceeds a second predefined portion of an external memory capacity. The first memory reports the second current congestion level 504 (i.e., SN[2]) to the one or more processing clusters jointly with the memory bandwidth usage state 402 of the corresponding memory block and the first current congestion level 604 (i.e., HN[2]). Additionally, in some implementations, in accordance with a determination that the first and second current congestion levels 604 and 504 satisfy a prefetch control condition, one or more processing clusters 202 select a first subset of prefetch requests having qualities that exceed a threshold quality corresponding to the prefetch control condition, includes the subset of prefetch requests in the memory access request queue 214, and excludes a second subset of prefetch requests having qualities that does not exceed the threshold quality from the memory access request queue 214.

In some implementations, each memory bandwidth usage state 402 associated with a respective memory block 222 includes a respective flag that is configured to be enabled by respective memory block 222 in accordance with (a) a determination that an average data access level to respective memory block 222 has exceeded the predefined threshold portion of the predefined memory access bandwidth and (b) a determination that the predefined memory access bandwidth is enforced or that an alternative congestion level of the memory blocks is high.

FIG. 12 is a flow chart of a method 1200 of tracking memory bandwidth usage of a memory block 222 of a memory system, in accordance with some implementations. The memory system includes a memory controller (e.g., memory controller 110) and a memory block 222. Memory block 222 is coupled to one or more processing clusters 202 via first memory (e.g., cache 220) in an electronic device. The method is implemented (1202) at the memory system. The memory system receives (1204) a set of data access requests associated with a plurality of clients 224 to memory block 222. Resources are partitioned (1206) to a plurality of resource portions to be utilized by the plurality of clients 224, each resource portion being assigned to a respective client and having a respective partition ID. For each resource portion having the respective partition ID (1208), the memory system (specifically, memory controller 110) identifies (1210) a subset of data access requests associated with the respective ID for accessing memory block 222 and tracks (1212) a memory bandwidth usage state 402 associated with the respective partition ID. Memory bandwidth usage state 402 indicates (1214) at least how much of a memory access bandwidth assigned to the respective partition ID to access the memory block is used. In response to each of the set of data access requests, the memory system reports (1216) the memory bandwidth usage state to the one or more processing clusters 202.

In some implementations, in response to receiving a read request, the memory system reports memory bandwidth usage state 402 to the one or more processing clusters 202, directly with a data item requested by the read request or indirectly via the first memory (e.g., cache 220). In response to receiving a write request, the memory system reports memory bandwidth usage state 402 of the memory block 222 to one or more processing clusters 202 indirectly via the first memory.

In some implementations, memory bandwidth usage state 402 associated with the respective partition ID is also tracked based on an alternative current congestion level of memory block 222 and/or whether a predefined memory access bandwidth is enforced. The alternative current congestion level of memory block 222 indicates whether the second total number of data access requests MCQ exceeds an alternative predefined portion of an external memory capacity.

In some implementations, for the respective partition ID, the memory system determines whether an average data access level to memory block 222 has exceeded a predefined threshold portion of the predefined memory access bandwidth assigned to the respective partition ID to access memory block 222. Further, in some implementations, the memory system monitors a second total number of data access requests that are waiting in a second request queue 510 of the memory system, and determines an alternative current congestion level indicating whether the second total number of data access requests exceeds an alternative predefined portion (e.g., x %) of an external memory capacity. Additionally, in some implementations, the memory system determines a second current congestion level 504 of the memory system indicating whether the second total number of data access requests MCQ exceeds a second predefined portion of the external memory capacity. Second current congestion level 504 is used to control throttling or qualities of prefetch requests of the one or more processing clusters. Optionally, the second and alternative predefined portions are distinct from or equal to each other. Also, in some embodiments, memory bandwidth usage state 402 includes a flag configured to indicate a heavy memory bandwidth usage state. The memory system enables the flag in accordance with (a) a determination that the average data access level to memory block 222 has exceeded the predefined threshold portion of the predefined memory access bandwidth and (b) a determination that the predefined memory access bandwidth is enforced or that the alternative current congestion level of memory block 222 is high.

In some implementations, for each partition ID, memory bandwidth usage state 402 associated with the respective partition ID includes a multibit state number (e.g., SN[0:1], and a magnitude of the multibit state number (e.g., SN[0:1]) increases with how much of the memory access bandwidth assigned to the respective partition ID to access memory block 222 is used.

It should be understood that the particular order in which the operations in FIGS. 10-12 have been described are merely exemplary and are not intended to indicate that the described order is the only order in which the operations could be performed. One of ordinary skill in the art would recognize various ways to reorder the operations described herein. Additionally, it should be noted that details of other processes described herein with respect to methods 1000, 1100, and 1200 (e.g., FIGS. 10-12) are also applicable in an exchangeable manner. For brevity, these details are not repeated here.

Implementation examples are described in at least the following numbered clauses:

Clause 1. A method for managing memory access, comprising, at an electronic device including one or more processing clusters and a plurality of memory blocks, each processing cluster including one or more respective processors and coupled to at least one of the memory blocks: partitioning resources of the electronic device into a plurality of resource portions to be utilized by a plurality of clients, each resource portion being assigned to a respective client and having a respective partition identifier (ID); receiving a plurality of data access requests associated with the plurality of clients to the plurality of memory blocks; and for each resource portion having the respective partition ID: tracking a plurality of memory bandwidth usage states corresponding to the memory blocks, wherein each memory bandwidth usage state is associated with a respective memory block and indicates at least how much of a memory access bandwidth assigned to the respective partition ID to access the respective memory block is used; determining a usage level associated with the respective partition ID from the plurality of memory bandwidth usage states; adjusting a credit count based on the usage level; comparing the adjusted credit count with a request issue threshold; and in accordance with a determination that the credit count is greater than the request issue threshold, issuing a next data access request associated with the respective partition ID in a memory access request queue.

Clause 2. The method of clause 1, further comprising, for each resource portion having the respective partition ID: in accordance with a determination that the credit count is less than the request issue threshold, suspending from issuing any data access request from the memory access request queue of the respective partition ID until the credit count is adjusted to be greater than the request issue threshold.

Clause 3. The method of clause 1 or 2, further comprising, for each resource portion having the respective partition ID: updating the one or more of the plurality of memory bandwidth usage states in response to a prior data access request that is issued immediately prior to the next data access request; wherein after a predefined number of clock cycles following the update of the one or more of the plurality of memory bandwidth usage states, the usage level is determined from the plurality of memory bandwidth usage states; and wherein after the predefined number of clock cycles following the update of the one or more of the plurality of memory bandwidth usage states and until the next data access request is issued, the credit count is adjusted and compared with the request issue threshold periodically.

Clause 4. The method of any of the preceding clauses, further comprising, after each of the plurality of data access requests is issued: receiving a respective response from a respective memory block associated with the issued data access request directly or indirectly; and updating the respective memory bandwidth usage state corresponding to the respective memory block associated with the issued data access request.

Clause 5. The method of any of the preceding clauses, wherein adjusting the credit count based on the usage level further comprises: in accordance with a determination that the usage level is equal to or greater than a high usage threshold, reducing the credit count by a respective credit unit corresponding to the respective partition ID; in accordance with a determination that the usage level is equal to or less than a low usage threshold, increasing the credit count by the respective credit unit; and in accordance with a determination that the usage level is between the high usage threshold and the low usage threshold, maintaining the credit count.

Clause 6. The method of any of the preceding clauses, wherein for each resource portion having the respective partition ID: each of the plurality of memory bandwidth usage states includes a respective multibit state number; and determining the usage level includes determining how many of the respective multibit state numbers of the memory bandwidth usage states are equal to a predefined value.

Clause 7. The method of any of the preceding clauses, wherein for each resource portion having the respective partition ID: each of the plurality of memory bandwidth usage states is represented by a flag indicating whether an average data access level of the respective memory block has exceeded a predefined threshold portion of the predefined memory access bandwidth assigned to the respective partition ID to access the respective memory block.

Clause 8. The method of clause 7, wherein for each resource portion having the respective partition ID, the usage level is represented by a total number of memory blocks for each of which the flag has a first value.

Clause 9. The method of clause 8, wherein for a first memory block, the flag has the first value, further comprising, for the first memory block: monitoring a second total number of data access requests that are waiting in a second request queue of the plurality of memory blocks; in accordance with a determination (a) that a first average data access level exceeds a first predefined threshold portion of a first predefined memory access bandwidth assigned to the respective partition ID to access the first memory block and (b) that the second total number of data access requests exceeds an alternative predefined portion of an external memory capacity, determining that the flag representing a first memory bandwidth usage state of the first memory block has the first value.

Clause 10. The method of clause 8, wherein for a first memory block, the flag has the first value, further comprising, for the first memory block: in accordance with a determination (a) that a first average data access level exceeds a first predefined threshold portion of a first predefined memory access bandwidth assigned to the respective partition ID to access the first memory block and (b) that the first predefined memory access bandwidth is enforced, determining that the flag representing a first memory bandwidth usage state of the first memory block has the first value.

Clause 11. The method of any of the preceding clauses, wherein for each resource portion having the respective partition ID, tracking the plurality of memory bandwidth usage states further comprises: sending each read or write request of the plurality of data access requests to a respective memory block via first memory associated with the one or more processing clusters and distinct from the memory blocks; in response to each read request issued from the respective partition ID to a respective memory block, updating the respective memory bandwidth usage state of the respective memory block from the respective memory block, directly with a data item requested by the read request or indirectly via the first memory; and in response to each write request issued from the respective partition ID to the respective memory block, updating the respective memory bandwidth usage state associated with the respective memory block from the first memory; and wherein the plurality of memory blocks are configured to receive data access requests sent from the one or more processing clusters to the first memory that are not satisfied by the first memory.

Clause 12. The method of any of the preceding clauses, wherein the electronic device further includes first memory configured to receive the plurality of data access requests and pass a subset of unsatisfied data access requests to the memory blocks, the method further comprising: obtaining a first current congestion level of the first memory indicating whether a first total number of data access requests that are waiting in a first request queue of the first memory exceeds a first predefined portion of a system cache capacity; and obtaining a second current congestion level of the plurality of memory blocks indicating whether a second total number of data access requests that are waiting in a second request queue of the plurality of memory blocks exceeds a second predefined portion of an external memory capacity.

Clause 13. The method of clause 12, wherein the plurality of data access requests include a plurality of prefetch requests, the method further comprising: in accordance with a determination that the first current congestion level satisfies a throttling condition, throttling the plurality of prefetch requests from the plurality of resource portions.

Clause 14. The method of clause 12, wherein the plurality of data access requests include a plurality of prefetch requests, the method further comprising: in accordance with a determination that the first and second current congestion levels satisfy a prefetch control condition, selecting a first subset of prefetch requests having qualities that exceed a threshold quality corresponding to the prefetch control condition, including the subset of prefetch requests in the memory access request queue, and excluding a second subset of prefetch requests having qualities that does not exceed the threshold quality from the memory access request queue.

Clause 15. The method of any of the preceding clauses, wherein the electronic device further includes first memory, and the plurality of memory bandwidth usage states corresponding to the memory blocks are tracked at the one or more processing clusters, the method further comprising, for each resource portion having the respective partition ID: at each memory block, tracking an average data access level of the respective partition ID to the respective memory block in real time, determining the respective memory bandwidth usage state associated with the respective memory block based on the average data access level, and reporting the respective memory bandwidth usage state to the first memory and the one or more processing clusters in response to the data access requests received from the one or more processing clusters; and at the first memory, receiving the respective memory bandwidth usage state reported by the plurality of memory blocks in response to the plurality of the data access requests received from the one or more processing clusters.

Clause 16. A method for managing memory access, comprising, at first memory coupled to one or more processing clusters and a plurality of memory blocks in an electronic device: forwarding a plurality of data access requests associated with a plurality of clients to a plurality of memory blocks, wherein resources of the electronic device are partitioned to a plurality of resource portions to be utilized by the plurality of clients, each resource portion being assigned to a respective client and having a respective partition identifier (ID); for each resource portion having the respective partition ID: identifying a subset of data access requests associated with the respective partition ID for accessing the memory blocks; tracking a plurality of memory bandwidth usage states corresponding to the memory blocks, wherein each memory bandwidth usage state is associated with a respective memory block and indicates at least how much of a memory access bandwidth assigned to the respective partition ID to access the respective memory block is used; in response to each of the subset of data access requests, determining the respective data access request is to access a corresponding memory block, receiving a memory bandwidth usage state of the corresponding memory block, and reporting the memory bandwidth usage state of the corresponding memory block to the one or more processing clusters.

Clause 17. The method of clause 16, further comprising: monitoring a first total number of data access requests that are waiting in a first request queue of the first memory, and determining a first current congestion level indicating whether the first total number of data access requests exceeds a first predefined portion of a system cache capacity; and in response to each of the subset of data access requests, reporting the first current congestion level jointly with the memory bandwidth usage state of the corresponding memory block to the one or more processing clusters.

Clause 18. The method of clause 17, further comprising, at the one or more processing clusters, in accordance with a determination that the first current congestion level satisfies a throttling condition, throttling a plurality of prefetch requests from the plurality of resource portions.

Clause 19. The method of clause 17 or 18, further comprising, in response to each of the subset of data access requests: updating, from the corresponding memory block, a second current congestion level indicating whether a second total number of data access requests that are waiting in a second request queue of the plurality of memory blocks exceeds a second predefined portion of an external memory capacity; reporting the second current congestion level to the one or more processing clusters jointly with the memory bandwidth usage state of the corresponding memory block and the first current congestion level.

Clause 20. The method of clause 19, further comprising, at the one or more processing clusters: in accordance with a determination that the first and second current congestion levels satisfy a prefetch control condition, selecting a first subset of prefetch requests having qualities that exceed a threshold quality corresponding to the prefetch control condition, including the subset of prefetch requests in a memory access request queue, and excluding a second subset of prefetch requests having qualities that does not exceed the threshold quality from the memory access request queue.

Clause 21. The method of any of clauses 16-20, wherein each memory bandwidth usage state associated with a respective memory block includes a respective flag that is configured to be enabled by the respective memory block in accordance with (a) a determination that an average data access level to the respective memory block has exceeded the predefined threshold portion of the predefined memory access bandwidth and (b) a determination that the predefined memory access bandwidth is enforced or that an alternative congestion level of the memory blocks is high.

Clause 22. A method for tracking memory usage, comprising, at a memory system coupled to one or more processing clusters via first memory in an electronic device, the memory system including a memory block: receiving a set of data access requests associated with a plurality of clients to the memory block, wherein resources are partitioned to a plurality of resource portions to be utilized by the plurality of clients, each resource portion being assigned to a respective client and having a respective partition identifier (ID); for each resource portion having the respective partition ID: identifying a subset of data access requests associated with the respective ID for accessing the memory block; tracking a memory bandwidth usage state associated with the respective partition ID, wherein the memory bandwidth usage state indicates at least how much of a memory access bandwidth assigned to the respective partition ID to access the memory block is used; and in response to each of the set of data access requests, reporting the memory bandwidth usage state to the one or more processing clusters.

Clause 23. The method of clause 22, wherein reporting the memory bandwidth usage to the one or more processing clusters further comprises: in response to receiving a read request, reporting the memory bandwidth usage state to the one or more processing clusters, directly with a data item requested by the read request or indirectly via the first memory; and in response to receiving a write request, reporting the memory bandwidth usage state to the one or more processing clusters indirectly via the first memory.

Clause 24. The method of clause 22 or 23, wherein the memory bandwidth usage state associated with the respective partition ID is also tracked based on an alternative current congestion level of the memory block and/or whether a predefined memory access bandwidth is enforced.

Clause 25. The method of any of clauses 22-24, tracking the memory bandwidth usage state associated with the respective partition ID further comprising, for the respective partition ID: determining whether an average data access level to the memory block has exceeded a predefined threshold portion of the predefined memory access bandwidth assigned to the respective partition ID to access the memory block.

Clause 26. The method of clause 25, tracking the memory bandwidth usage state associated with the respective partition ID further comprising: monitoring a second total number of data access requests that are waiting in a second request queue of the memory system; and determining an alternative current congestion level indicating whether the second total number of data access requests exceeds an alternative predefined portion of an external memory capacity.

Clause 27. The method of clause 26, further comprising: determining a second current congestion level indicating whether the second total number of data access requests exceeds a second predefined portion of the external memory capacity, wherein the second current congestion level is used to control throttling or qualities of prefetch requests of the one or more processing clusters.

Clause 28. The method of clause 26, wherein the memory bandwidth usage state includes a flag configured to indicate a heavy memory bandwidth usage state, further comprising: enabling the flag in accordance with (a) a determination that the average data access level to the memory block has exceeded the predefined threshold portion of the predefined memory access bandwidth and (b) a determination that the predefined memory access bandwidth is enforced or that the alternative current congestion level of the memory block is high.

Clause 29. The method of any of clauses 16-28, wherein for each partition ID, the memory bandwidth usage state associated with the respective partition ID includes a multibit state number, and a magnitude of the multibit state number increases with how much of the memory access bandwidth assigned to the respective partition ID to access the memory block is used.

Clause 30. An electronic device, comprising: one or more processing clusters; and a plurality of memory blocks coupled to each processing cluster; wherein each processing cluster includes one or more respective processors and a controller, and the controller is configured to perform a method of any of clauses 1-29.

Clause 31. A non-transitory computer-readable medium, having instructions stored thereon, which when executed by a controller of an electronic device cause the controller to perform a method of any of clauses 1-29.

Clause 32. An apparatus for managing memory access at an electronic device including one or more processing clusters and a plurality of memory blocks, each processing cluster including one or more respective processors and coupled to at least one of the memory blocks, the apparatus comprising means for performing operations of a method of any of clauses 1-15.

Clause 33. An apparatus for managing memory access at first memory coupled to one or more processing clusters and a plurality of memory blocks in an electronic device, the apparatus comprising means for performing operations of a method of any of clauses 16-21.

Clause 34. An apparatus for tracking memory usage at a memory system coupled to one or more processing clusters via first memory in an electronic device, the memory system including a memory block, the apparatus comprising means for performing operations of a method of any of clauses 22-29.

The above description has been provided with reference to specific implementations. However, the illustrative discussions above are not intended to be exhaustive or to be limiting to the precise forms disclosed. Many modifications and variations are possible in view of the above teachings. The implementations were chosen and described in order to best explain the principles disclosed and their practical applications, to thereby enable others to best utilize the disclosure and various implementations with various modifications as are suited to the particular use contemplated.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for managing memory access, comprising, at a first memory coupled to one or more processing clusters and a plurality of memory blocks in an electronic device:
    forwarding a plurality of data access requests associated with a plurality of clients to the plurality of memory blocks, wherein resources of the electronic device are partitioned to a plurality of resource portions to be utilized by the plurality of clients, each resource portion being assigned to a respective client and having a respective partition identifier (ID);
    for each resource portion having the respective partition ID:
        identifying a subset of data access requests associated with the respective partition ID for accessing the plurality of memory blocks;
    tracking a plurality of memory bandwidth usage states corresponding to the plurality of memory blocks, wherein each memory bandwidth usage state is associated with a respective memory block and indicates at least how much of a memory access bandwidth assigned to the respective partition ID to access the respective memory block is used; and
    in response to each data access request of the subset of data access requests:
        determining the respective data access request is to access a corresponding memory block, receiving the memory bandwidth usage state of the corresponding memory block, and reporting the memory bandwidth usage state of the corresponding memory block to the one or more processing clusters.

2. The method of claim 1, further comprising:
    monitoring a first total number of data access requests that are waiting in a first request queue of the first memory, and determining a first current congestion level indicating whether the first total number of data access requests exceeds a first predefined portion of a system cache capacity; and in response to each data access request of the subset of data access requests, reporting the first current congestion level jointly with the memory bandwidth usage state of the corresponding memory block to the one or more processing clusters.

3. The method of claim 2, further comprising, at the one or more processing clusters, in accordance with a determination that the first current congestion level satisfies a throttling condition, throttling a plurality of prefetch requests from the plurality of resource portions.

4. The method of claim 2, further comprising, in response to each data access request of the subset of data access requests:
updating, from the corresponding memory block, a second current congestion level indicating whether a second total number of data access requests that are waiting in a second request queue of the plurality of memory blocks exceeds a second predefined portion of an external memory capacity; and
reporting the second current congestion level to the one or more processing clusters jointly with the memory bandwidth usage state of the corresponding memory block and the first current congestion level.

5. The method of claim 4, further comprising, at the one or more processing clusters:
in accordance with a determination that the first and second current congestion levels satisfy a prefetch control condition, selecting a first subset of prefetch requests having first qualities that exceed a threshold quality corresponding to the prefetch control condition, including a subset of prefetch requests in a memory access request queue, and excluding a second subset of prefetch requests having second qualities that does not exceed the threshold quality from the memory access request queue.

6. The method of claim 1, wherein each memory bandwidth usage state associated with a respective memory block includes a respective flag that is configured to be enabled by the respective memory block in accordance with (a) a determination that an average data access level to the respective memory block has exceeded a predefined threshold portion of a predefined memory access bandwidth and (b) a determination that the predefined memory access bandwidth is enforced or that an alternative congestion level of the plurality of memory blocks is high.

7. An electronic device, comprising:
one or more processing clusters;
a plurality of memory blocks; and
a cache memory coupled to the one or more processing clusters and the plurality of memory blocks, the cache memory configured to:
forward a plurality of data access requests associated with a plurality of clients to the plurality of memory blocks, wherein resources of the electronic device are partitioned to a plurality of resource portions to be utilized by the plurality of clients, each resource portion being assigned to a respective client and having a respective partition identifier (ID);
for each resource portion having the respective partition ID, the cache memory configured to:
identify a subset of data access requests associated with the respective partition ID for accessing the plurality of memory blocks;
track a plurality of memory bandwidth usage states corresponding to the plurality of memory blocks, wherein each memory bandwidth usage state is associated with a respective memory block and indicates at least how much of a memory access bandwidth assigned to the respective partition ID to access the respective memory block is used; and
in response to each data access request of the subset of data access requests, the cache memory configured to:
determine the respective data access request is to access a corresponding memory block, receive the memory bandwidth usage state of the corresponding memory block, and report the memory bandwidth usage state of the corresponding memory block to the one or more processing clusters.

8. The electronic device of claim 7, wherein the electronic device is configured to:
monitor a first total number of data access requests that are waiting in a first request queue of the cache memory, and determine a first current congestion level indicating whether the first total number of data access requests exceeds a first predefined portion of a system cache capacity; and
in response to each data access request of the subset of data access requests, report the first current congestion level jointly with the memory bandwidth usage state of the corresponding memory block to the one or more processing clusters.

9. The electronic device of claim 8, further comprising, at the one or more processing clusters, in accordance with a determination that the first current congestion level satisfies a throttling condition, throttling a plurality of prefetch requests from the plurality of resource portions.

10. The electronic device of claim 8, wherein the cache memory is further configured to, in response to each data access request of the subset of data access requests;
update, from the corresponding memory block, a second current congestion level indicating whether a second total number of data access requests that are waiting in a second request queue of the plurality of memory blocks exceeds a second predefined portion of an external memory capacity; and
report the second current congestion level to the one or more processing clusters jointly with the memory bandwidth usage state of the corresponding memory block and the first current congestion level.

11. The electronic device of claim 10, wherein the one or more processing clusters are configured to, in accordance with a determination that the first current congestion level and the second current congestion level satisfy a prefetch control condition:
select a first subset of prefetch requests having first qualities that exceed a threshold quality corresponding to the prefetch control condition, including a subset of prefetch requests in a memory access request queue, and excluding a second subset of prefetch requests having second qualities that do not exceed the threshold quality from the memory access request queue.

12. The electronic device of claim 7, wherein each memory bandwidth usage state associated with a respective memory block includes a respective flag that is configured to be enabled by the respective memory block in accordance with (a) a determination that an average data access level to the respective memory block has exceeded a predefined threshold portion of a predefined memory access bandwidth and (b) a determination that the predefined memory access bandwidth is enforced or that an alternative congestion level of the plurality of memory blocks is high.

13. An electronic device for managing memory access including a first memory coupled to one or more processing clusters and a plurality of memory blocks in the electronic device, comprising:
- means for forwarding a plurality of data access requests associated with a plurality of clients to the plurality of memory blocks, wherein resources of the electronic device are partitioned to a plurality of resource portions to be utilized by the plurality of clients, each resource portion being assigned to a respective client and having a respective partition identifier (ID);
- for each resource portion having the respective partition ID:
  - means for identifying a subset of data access requests associated with the respective partition ID for accessing the plurality of memory blocks;
  - tracking a plurality of memory bandwidth usage states corresponding to the plurality of memory blocks, wherein each memory bandwidth usage state is associated with a respective memory block and indicates at least how much of a memory access bandwidth assigned to the respective partition ID to access the respective memory block is used;
  - in response to each data access request of the subset of data access requests,
    - means for determining the respective data access request is to access a corresponding memory block, receiving the memory bandwidth usage state of the corresponding memory block, and reporting the memory bandwidth usage state of the corresponding memory block to the one or more processing clusters.

14. The electronic device of claim 13, further comprising:
- means for monitoring a first total number of data access requests that are waiting in a first request queue of the first memory, and determining a first current congestion level indicating whether the first total number of data access requests exceeds a first predefined portion of a system cache capacity; and
- in response to each of the subset of data access requests, means for reporting the first current congestion level jointly with the memory bandwidth usage state of the corresponding memory block to the one or more processing clusters.

15. The electronic device of claim 14, further comprising, in accordance with a determination that the first current congestion level satisfies a throttling condition:
- means for throttling a plurality of prefetch requests from the plurality of resource portions.

16. The electronic device of claim 14, further comprising, in response to each data access request of the subset of data access requests:
- means for updating, from the corresponding memory block, a second current congestion level indicating whether a second total number of data access requests that are waiting in a second request queue of the plurality of memory blocks exceeds a second predefined portion of an external memory capacity; and
- means for reporting the second current congestion level to the one or more processing clusters jointly with the memory bandwidth usage state of the corresponding memory block and the first current congestion level.

17. The electronic device of claim 16, further comprising:
- in accordance with a determination that the first current congestion level and the second current congestion level satisfy a prefetch control condition:
  - means for selecting a first subset of prefetch requests having first qualities that exceed a threshold quality corresponding to the prefetch control condition, including a subset of prefetch requests in a memory access request queue, and excluding a second subset of prefetch requests having second qualities that do not exceed the threshold quality from the memory access request queue.

18. The electronic device of claim 13, wherein each memory bandwidth usage state associated with a respective memory block includes a respective flag that is configured to be enabled by the respective memory block in accordance with (a) a determination that an average data access level to the respective memory block has exceeded a predefined threshold portion of a predefined memory access bandwidth and (b) a determination that the predefined memory access bandwidth is enforced or that an alternative congestion level of the plurality of memory blocks is high.

* * * * *